US011945208B2

(12) United States Patent
Lynch et al.

(10) Patent No.: US 11,945,208 B2
(45) Date of Patent: Apr. 2, 2024

(54) SYSTEMS AND METHODS FOR IMPROVING RELIABILITY OF REPLACING ITEMS IN A STENCIL PRINTER

(71) Applicant: Illinois Tool Works Inc., Glenview, IL (US)

(72) Inventors: James Lynch, Uxbridge, MA (US); Kenneth J. King, East Freetown, MA (US); Patsy A. Mattero, Smithfield, RI (US); William A. Losiewicz, Douglas, MA (US)

(73) Assignee: Illinois Tool Works Inc., Glenview, IL (US)

( * ) Notice: Subject to any disclaimer, the term of this patent is extended or adjusted under 35 U.S.C. 154(b) by 7 days.

(21) Appl. No.: 17/876,978

(22) Filed: Jul. 29, 2022

(65) Prior Publication Data

US 2024/0034048 A1 Feb. 1, 2024

(51) Int. Cl.

| | |
|---|---|
| ***B41F 15/34*** | (2006.01) |
| ***B41F 15/12*** | (2006.01) |
| ***B41F 15/40*** | (2006.01) |

(52) U.S. Cl.

CPC .............. *B41F 15/12* (2013.01); *B41F 15/34* (2013.01); *B41F 15/40* (2013.01); *B41P 2215/10* (2013.01)

(58) Field of Classification Search

CPC .. B41J 15/12; B41J 15/34; B41J 15/40; B41P 2215/10

See application file for complete search history.

(56) References Cited

U.S. PATENT DOCUMENTS

| | | | | |
|---|---|---|---|---|
| 10,927,873 | B1 * | 2/2021 | Neal | H02J 50/10 |
| 2020/0396843 | A1 * | 12/2020 | Losiewicz | B41M 1/12 |
| 2021/0402441 | A1 * | 12/2021 | Fischer | B07C 5/36 |

FOREIGN PATENT DOCUMENTS

| | | | | |
|---|---|---|---|---|
| CN | 102615975 | * | 8/2012 | |
| JP | 2011136462 A | * | 7/2011 | |
| WO | WO-2021012216 A1 | * | 1/2021 | A61B 50/10 |

* cited by examiner

*Primary Examiner* — Christopher E Mahoney
*Assistant Examiner* — Marissa Ferguson-Samreth
(74) *Attorney, Agent, or Firm* — Lando & Anastasi, LLP

(57) ABSTRACT

A movable cart includes a housing configured to move along a horizontal surface and a plurality of shelves supported by the housing Each shelf of the plurality of shelves is configured to move between a retracted in which the shelf is positioned within the housing and an extended position in which the shelf extends from the housing. The movable cart further includes a sensing system configured to determine whether each shelf of the plurality of shelves is in the retracted position and a type of item supported by the shelf. Other aspects of the movable cart are further disclosed.

17 Claims, 21 Drawing Sheets

SYSTEMS AND METHODS FOR IMPROVING RELIABILITY OF REPLACING ITEMS IN A STENCIL PRINTER

BACKGROUND OF THE DISCLOSURE

1. Field of Invention

This application relates generally to stencil printers and related methods to print viscous materials, e.g., solder paste, on an electronic substrate, e.g., a printed circuit board (PCB), and more particularly to systems and methods for replacing items in a stencil printer.

2. Discussion of Related Art

In manufacturing a surface-mount printed circuit board, a stencil printer can be used to print solder paste onto the circuit board. Typically, a circuit board having a pattern of pads or some other conductive surface onto which solder paste will be deposited is automatically fed into the stencil printer; and one or more small holes or marks (known as "fiducials") on the circuit board are used to properly align the circuit board with the stencil or screen of the stencil printer prior to printing solder paste onto the circuit board. In some systems, an optical alignment system embodying a vision system is used to align the circuit board with the stencil.

Once the circuit board has been properly aligned with the stencil in the printer, the circuit board is raised to the stencil, solder paste is dispensed onto the stencil, and a wiper blade (or squeegee) traverses the stencil to force the solder paste through apertures in the stencil and onto the circuit board. As the squeegee is moved across the stencil, the solder paste tends to roll in front of the blade, which desirably causes mixing and shearing of the solder paste so as to attain a desired viscosity to facilitate filling of the apertures in the screen or stencil. The solder paste typically is dispensed onto the stencil from a standard cartridge. The stencil is then separated from the circuit board and the adhesion between the circuit board and the solder paste causes most of the material to stay on the circuit board. Material left on the surface of the stencil is removed in a cleaning process before additional circuit boards are printed.

Another process in the printing of circuit boards involves inspection of the circuit boards after solder paste has been deposited on the surface of the circuit boards. Inspecting the circuit boards is important for determining that clean electrical connections can be made. An excess of solder paste can lead to shorts, while too little solder paste in appropriate positions can prevent electrical contact. Generally, the vision inspection system is further employed to provide a two-dimensional or a three-dimensional inspection of the solder paste on the circuit board.

Present day stencil printers require manual intervention to perform routine operations. For example, during a changeover, an operator must perform many manual tasks, such as changing a stencil, replacing a solder paste cartridge, replacing squeegee blades, and replacing support tooling. Each of these tasks require the operator to manually perform the task. For example, with most stencil printers, the operator must unlock the stencil, remove the stencil, properly insert a replacement stencil, and lock the replacement stencil in place. A changeover operation can take as long as 30 minutes, during which the stencil printer is not operating, which may result in the PCB fabrication line not operating.

SUMMARY OF THE DISCLOSURE

One aspect of the present disclosure is directed to a movable cart comprising a housing configured to move along a horizontal surface and a plurality of shelves supported by the housing. Each shelf of the plurality of shelves is configured to move between a retracted in which the shelf is positioned within the housing and an extended position in which the shelf extends from the housing. The movable cart further comprises a sensing system configured to determine whether each shelf of the plurality of shelves is in the retracted position and a type of item supported by the shelf.

Embodiments of the movable cart further may include configuring the sensing system, for each shelf, with at least one sensor coupled to the housing and at least one flag coupled to the housing. The sensing system, for each shelf, may include a first sensor associated with a first flag positioned at an upper location with respect to the shelf and a second sensor associated with a second flag positioned at a lower location with respect to the shelf. When the shelves are in the retracted position within the housing of the movable cart, the sensors may be configured to return one of the following signals: upper low(off) and lower low(off) =shelf empty; upper high(on) and lower low(off)=load tool tray; upper low(off) and lower high(on)=unload tool tray; and upper high(on) and lower high(on)=stencil. The first sensor and the second sensor further may be configured to generate a signal as to whether the item is fully inserted into its respective shelf.

Another aspect of the present disclosure is directed to a method to determine whether shelves of a movable cart are retracted positions. In one embodiment, the method comprises: sensing a flag associated with a shelf to determine a position of the shelf.

Embodiments of the method further may include providing a first sensor associated with a first flag positioned at an upper location with respect to the shelf and a second sensor associated with a second flag positioned at a lower location with respect to the shelf. When the shelves are in the retracted position within the housing of the movable cart, the sensors may be configured to return one of the following signals: upper low(off) and lower low(off)=shelf empty; upper high(on) and lower low(off)=load tool tray; upper low(off) and lower high(on)=unload tool tray; and upper high(on) and lower high(on)=stencil. The first sensor and the second sensor further may be configured to generate a signal as to whether the item is fully inserted into its respective shelf.

Yet another aspect of the present disclosure is directed to a system for mechanically and electrically coupling a movable cart to a stencil printer, the stencil printer having at least one item of a plurality of items for replacement within the stencil printer, the stencil printer including a docking station configured to receive the movable cart, the movable cart being configured to receive a used item and/or provide a new item to the stencil printer. In one embodiment, the system comprises a first interface panel associated with one of the stencil printer and the movable cart. The first interface panel includes a latching magnet and an array of metallic pads. The system further comprises a second interface panel associated with the other of the stencil printer and the movable cart. The second interface panel includes a metal plate and an array of contacts. When docking the movable cart to the stencil printer, the latching magnet of the first interface panel is configured to magnetically secure the metal plate of the second interface panel, and the array of contacts of the second interface panel is configured to engage the array of metallic pads of the first interface panel.

Embodiments of the system further may include a third interface panel associated with the stencil printer and spaced apart from the first interface panel, and a fourth interface panel associated with the movable cart and spaced apart from the second interface panel. The first interface panel may be associated with the stencil printer and the second interface panel may be associated with the movable cart. The metal plate may be a steel plate. The latching magnet of the first interface panel may be configured to communicate with a controller associated with the movable cart or a controller of the stencil printer to control the operation of the latching magnet to secure or unsecure the movable cart from the stencil printer. The array of contacts may include a plurality of spring contacts. The metal pads may include a plurality of hard gold pads. The system further includes a guide assembly to guide the movable cart to the stencil printer when docking the movable cart to the stencil printer. The guide assembly may include at least one forward facing roller secured to the housing of the movable cart. The at least one forward facing roller may be configured to contact at least one guide provided on a face of the stencil printer. The at least one forward facing roller may include two spaced apart forward facing rollers and the at least one guide includes two spaced apart guides. The two spaced apart forward facing rollers may be configured to contact the two spaced apart guides to guide the movable cart with respect to the stencil printer.

Another aspect of the present disclosure is directed to a method for mechanically and electrically coupling a movable cart to a stencil printer, the stencil printer having at least one item of a plurality of items for replacement within the stencil printer, the stencil printer including a docking station configured to receive the movable cart, the movable cart being configured to receive a used item and/or provide a new item to the stencil printer. In one embodiment, the method comprises: providing a first interface panel associated with one of the stencil printer and the movable cart, the first interface panel including a latching magnet and an array of metallic pads; providing a second interface panel associated with the other of the stencil printer and the movable cart, the second interface panel including a metal plate and an array of contacts; magnetically securing the metal plate of the second interface panel with the latching magnet of the first interface panel; and engaging the array of metallic pads of the first interface panel with the array of contacts of the second interface panel.

Embodiments of the method further may include a third interface panel associated with the stencil printer and spaced apart from the first interface panel, and a fourth interface panel associated with the movable cart and spaced apart from the second interface panel. The first interface panel may be associated with the stencil printer and the second interface panel may be associated with the movable cart. The latching magnet of the first interface panel may be configured to communicate with a controller associated with the movable cart or a controller of the stencil printer to control the operation of the latching magnet to secure or unsecure the movable cart from the stencil printer. The method further may include guiding the movement of the movable cart to the stencil printer when docking the movable cart to the stencil printer. Guiding the movement of the movable cart may include a guide assembly having at least one forward facing roller secured to a housing of the movable cart. The at least one forward facing roller may be configured to contact at least one guide provided on a face of the stencil printer. The at least one forward facing roller may include two spaced apart forward facing rollers and the at least one guide includes two spaced apart guides. The two spaced apart forward facing rollers may be configured to contact the two spaced apart guides to guide the movable cart with respect to the stencil printer.

Another aspect of the present disclosure is directed to a system of measuring assembly material in a cartridge tube of a stencil printer including a carousel configured to support at least one cartridge tube. In one embodiment, the system comprises a laser height sensor coupled to a frame of the stencil printer. The laser height sensor is positioned above the at least one cartridge tube and configured to generate a laser beam toward the at least one cartridge tube to determine a height of assembly material within the at least one cartridge tube.

Another aspect of the present disclosure is directed to a method of measuring assembly material in a cartridge tube of a stencil printer including a carousel configured to support at least one cartridge tube. In one embodiment, the method comprises: sensing a height of assembly material within the at least one cartridge tube supported by the carousel; and if the at least one cartridge tube is determined to be empty, providing an alert to replace the at least one cartridge tube with a new cartridge tube, and, if the at least one cartridge tube is determined to have a sufficient amount of assembly material, continuing with use of the at least one cartridge tube.

Embodiments of the method further may include sensing a height of assembly material being achieved by a laser height sensor coupled to a frame of the stencil printer. The laser height sensor may be positioned above the at least one cartridge tube and configured to generate a laser beam toward the at least one cartridge tube to determine a height of assembly material within the at least one cartridge tube. The method further may include calibrating the laser height sensor to determine a zero-reference position.

BRIEF DESCRIPTION OF THE DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION OF THE DISCLOSURE

Figure 1:
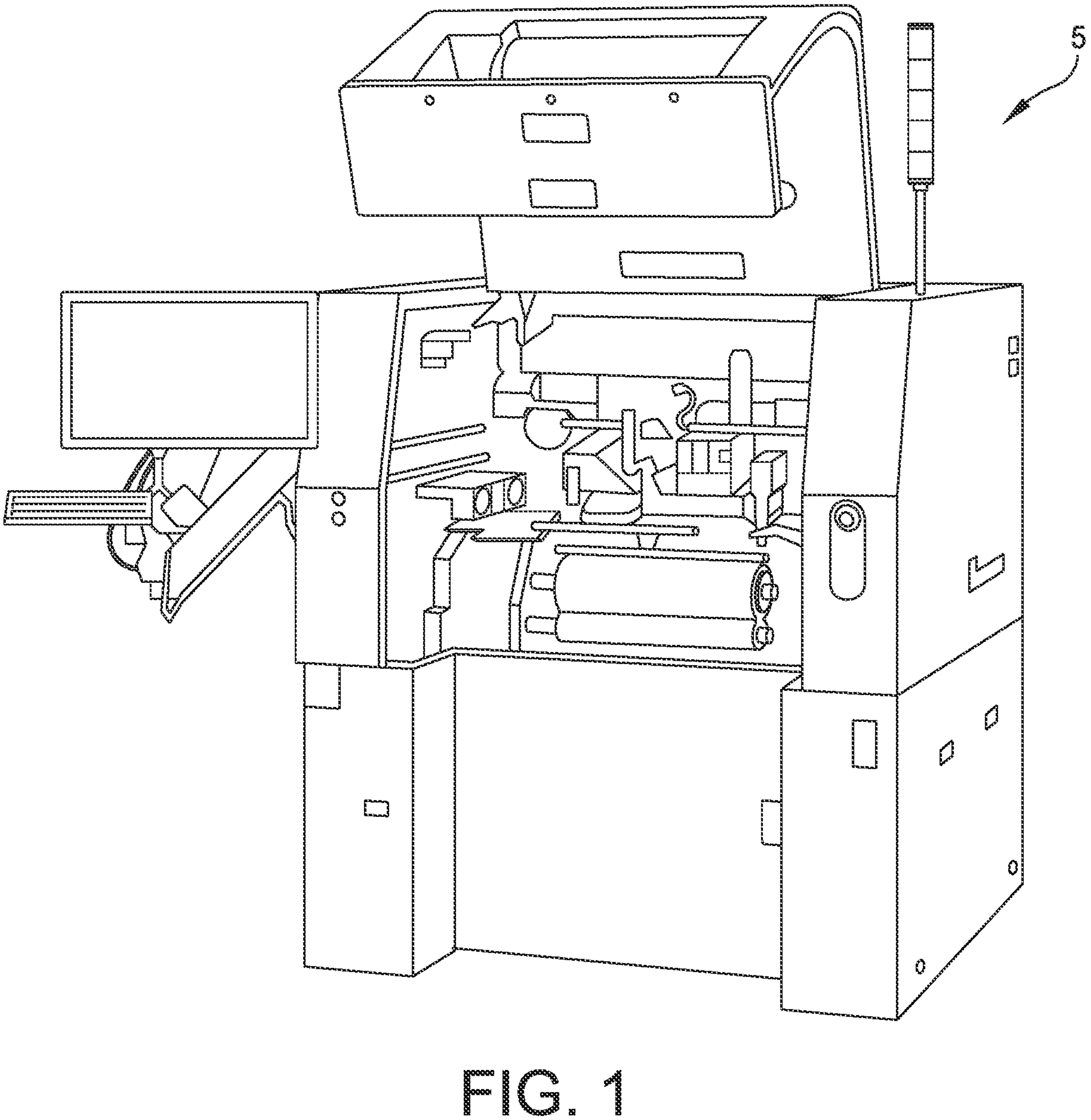
FIG. 1 is a front perspective view of a stencil printer.

The present disclosure relates generally to material application machines (referred to herein as "stencil printers," "screen printers," "printing machines," or "printers") and other equipment utilized in a surface mount technology (SMT) process lines and configured to apply an assembly material (e.g., solder paste, conductive ink, or encapsulation material) onto a substrate (e.g., a printed circuit board, referred to herein as an "electronic substrate," a "circuit board," a "board," a "PCB," a "PCB substrate," a "substrate," or a "PCB board") or to perform other operations, such as inspection, rework, or placement of electronic components onto a substrate. Specifically, embodiments of the present disclosure are described below with reference to stencil printers used to produce printed circuit boards.

For the purposes of illustration only, and not to limit the generality, the present disclosure will now be described in detail with reference to the accompanying figures. This disclosure is not limited in its application to the details of construction and the arrangement of components set forth in the following description or illustrated in the drawings. The principles set forth in this disclosure are capable of other embodiments and of being practiced or carried out in various ways. Also, the phraseology and terminology used herein is for the purpose of description and should not be regarded as limiting. Any references to examples, embodiments, components, elements or acts of the systems and methods herein referred to in the singular may also embrace embodiments including a plurality, and any references in plural to any embodiment, component, element or act herein may also embrace embodiments including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. In addition, in the event of inconsistent usages of terms between this document and documents incorporated herein by reference, the term usage in the incorporated reference is supplementary to that of this document; for irreconcilable inconsistencies, the term usage in this document controls.

For purposes of illustration, embodiments of the present disclosure will now be described with reference to a stencil printer used to print an assembly material, such as solder paste, onto a circuit board. One skilled in the art will appreciate, however, that embodiments of the present disclosure are not limited to stencil printers that print solder paste onto circuit boards, but rather, may be used in other applications requiring dispensing of other viscous assembly materials, such as glues and encapsulants. For example, the apparatus may be used to print epoxy for use as underfill for chip-scale packages. Further, stencil printers in accordance with embodiments of the present disclosure are not limited to those that print assembly materials on circuit boards, but rather, include those used for printing other materials on a variety of substrates, such as semiconductor wafers. Also, the terms screen and stencil may be used interchangeably herein to describe a device in a printer that defines a pattern to be printed onto a substrate. In certain embodiments, the stencil printer may include a Momentum® or an Edison™ series stencil printer platform offered by ITW Electronic Assembly Equipment of Hopkinton, Massachusetts. An exemplary stencil printer is generally designated at 5 in FIG. 1. In this embodiment, the stencil printer 5 is a Momentum® series stencil printer platform offered by ITW Electronic Assembly Equipment of Hopkinton, Massachusetts.

Figure 2:
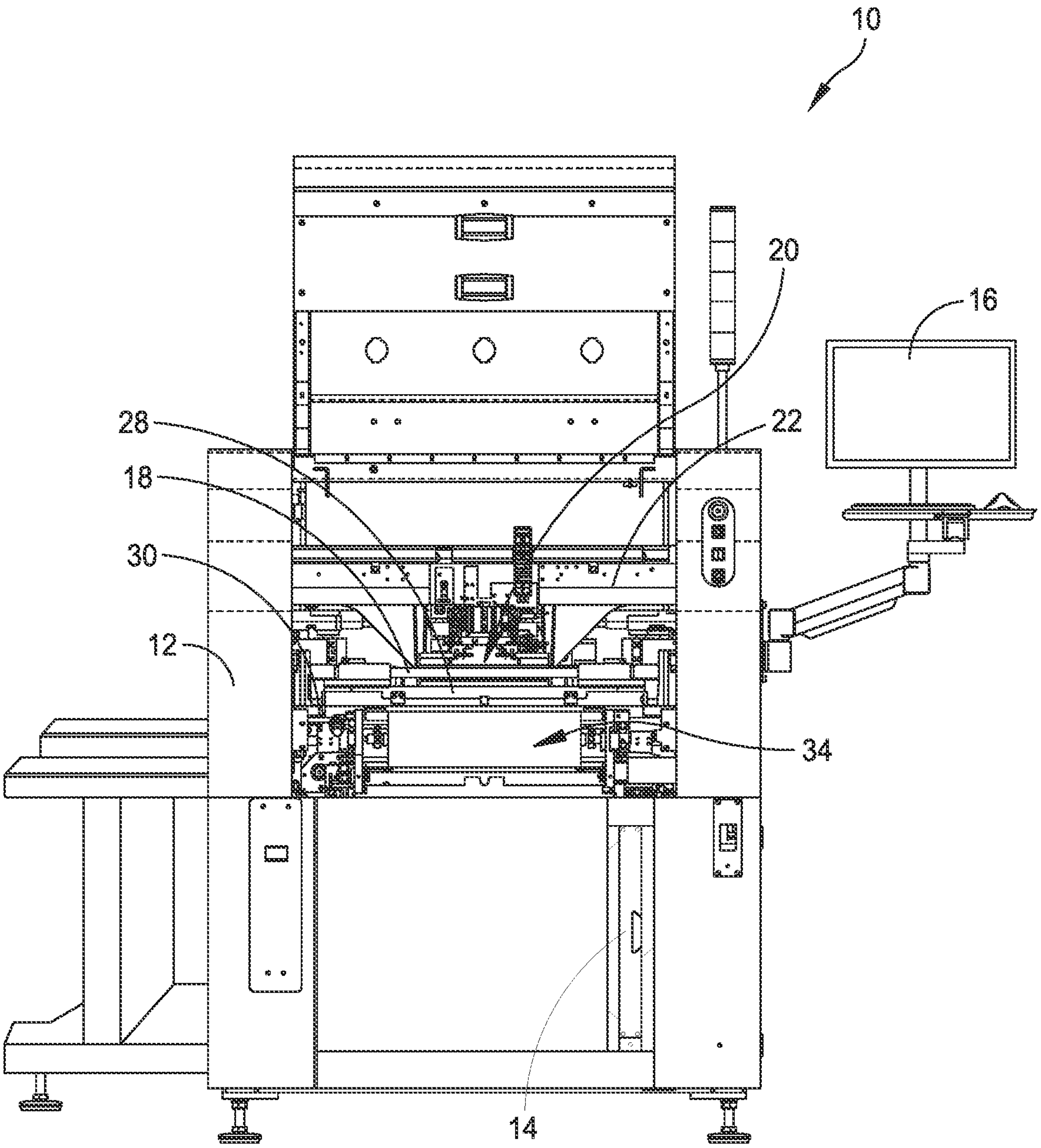
FIG. 2 is a front view of a stencil printer.

Referring to FIG. 2, there is generally indicated at 10 a stencil printer of an embodiment of the disclosure. As shown, the stencil printer 10 includes a frame 12 that supports components of the stencil printer. The components of the stencil printer may include, in part, a controller 14, a display 16, a stencil 18, and a print head or print head assembly, generally indicated at 20, which is configured to apply the solder paste in a manner described in greater detail below.

As shown in FIG. 2 and described below, the stencil and the print head assembly may be suitably coupled or otherwise connected to the frame 12. In one embodiment, the print head assembly 20 may be mounted on a print head assembly gantry 22, which may be mounted on the frame 12. The print head assembly gantry 22 enables the print head assembly 20 to be moved in the y-axis direction under the control of the controller 14 and to apply pressure on the print head assembly as it engages the stencil 18. In a certain embodiment, the print head assembly 20 may be placed over the stencil 18 and may be lowered in the z-axis direction into contact and sealingly engage the stencil.

The stencil printer 10 may also include a conveyor system having rails (not shown) for transporting a printed circuit board (sometimes referred to as a "printed wiring board," "substrate," or "electronic substrate" herein) to a print position in the stencil printer. The rails sometimes may be referred to herein as a "tractor feed mechanism," which is configured to feed, load or otherwise deliver circuit boards to the working area of the stencil printer, which may be referred to herein as a "print nest," and to unload circuit boards from the print nest.

Figure 3:
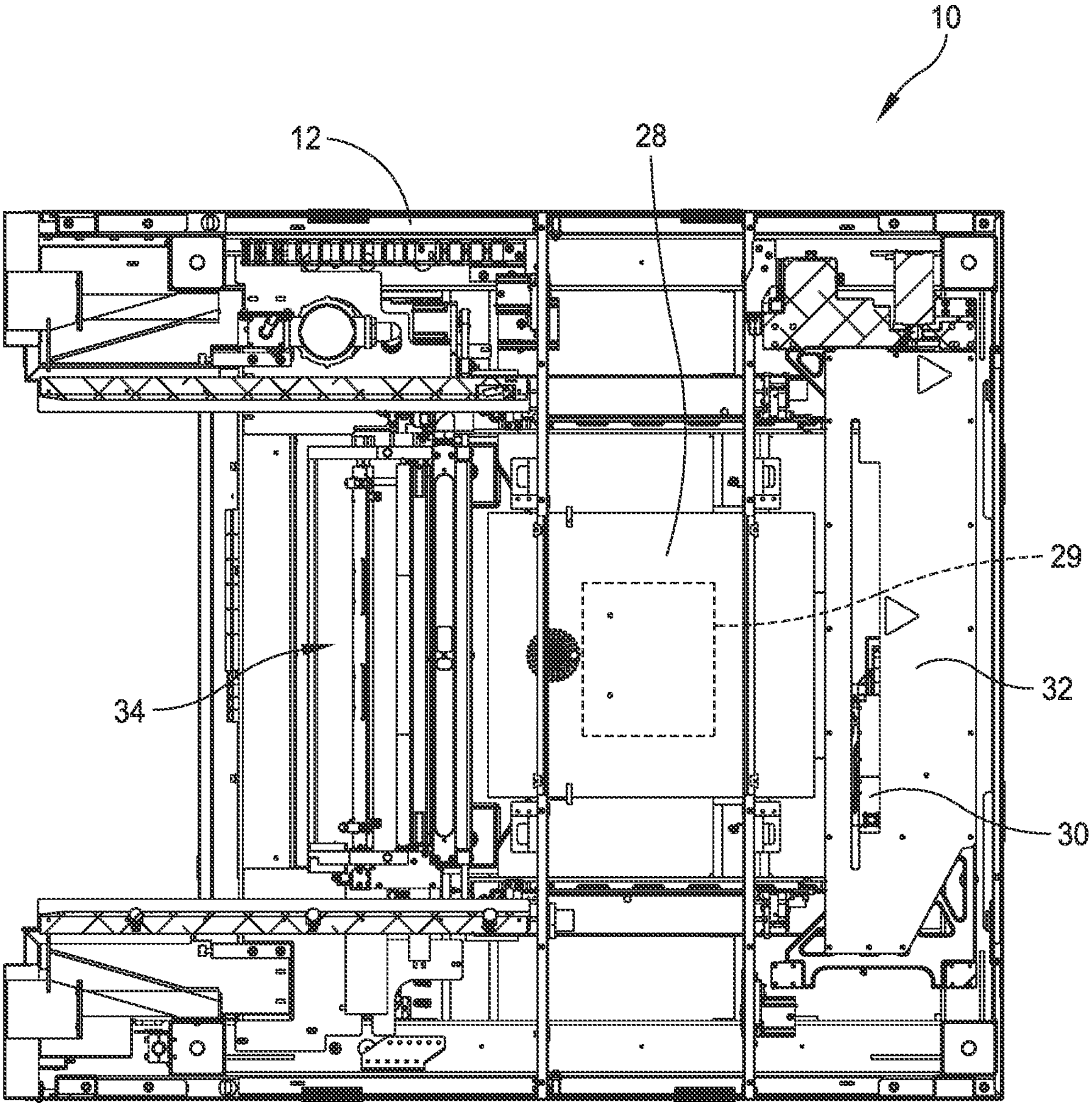
FIG. 3 is a top plan view of the stencil printer illustrated in FIG. 2 with portions removed.

Referring additionally to FIG. 3, the stencil printer 10 has a support assembly 28 to support the circuit board 29 (shown in dashed lines), which raises and secures the circuit board so that it is stable during a print operation. In certain embodiments, the substrate support assembly 28 further may include a particular substrate support system, e.g., a solid support, a plurality of pins or flexible tooling, which is positioned beneath the circuit board when the circuit board is in the print position. The substrate support system may be used, in part, to support the interior regions of the circuit board to prevent flexing or warping of the circuit board during the print operation.

In one embodiment, the print head assembly 20 may be configured to receive solder paste from a source, such as a dispenser, e.g., a solder paste cartridge, that provides solder paste to the print head assembly during the print operation. Other methods of supplying solder paste may be employed in place of the cartridge. For example, solder paste may be manually deposited between the blades or from an external source. Additionally, in a certain embodiment, the controller 14 may be configured to use a personal computer having a suitable operating system, such as a Microsoft Windows® operating system provided by Microsoft Corporation, with application specific software to control the operation of the stencil printer 10. The controller 14 may be networked with a master controller that is used to control a production line for fabricating circuit boards.

In one configuration, the stencil printer 10 operates as follows. A circuit board 29 is loaded into the stencil printer 10 using the conveyor rails. The support assembly 28 raises and secures the circuit board 29 to a print position. The print head assembly 20 is then lowered in the z-axis direction until blades of the print head assembly contact the stencil 18 at a desired pressure. The print head assembly 20 is then moved in the y-axis direction across the stencil 18 by the print head assembly gantry 22. The print head assembly 20 deposits solder paste through apertures in the stencil 18 and onto the circuit board 29. Once the print head assembly has fully traversed the stencil 18 across the apertures, the print head assembly is lifted off the stencil and the circuit board 29 is lowered back onto the conveyor rails. The circuit board 29 is released and transported from the stencil printer 10 so that a second circuit board may be loaded into the stencil printer. To print on the second circuit board 29, the print head assembly is lowered in the z-axis direction into contact with the stencil and moved across the stencil 18 in the direction opposite to that used for the first circuit board.

An imaging system 30 may be provided for the purposes of aligning the stencil 18 with the circuit board 29 prior to printing and to inspect the circuit board after printing. In one embodiment, the imaging system 30 may be disposed between the stencil 18 and the support assembly 28 upon which a circuit board is supported. The imaging system 30 is coupled to an imaging gantry 32 to move the imaging system. In one embodiment, the imaging gantry 32 may be coupled to the frame 12, and includes a beam that extends between side rails of the frame 12 to provide back and forth movement of the imaging system 30 over the circuit board 29 in a y-axis direction. The imaging gantry 32 further may include a carriage device, which houses the imaging system 30, and is configured to move along the length of the beam in an x-axis direction. The construction of the imaging gantry 32 used to move the imaging system 30 is well known in the art of solder paste printing. The arrangement is such that the imaging system 30 may be located at any position below the stencil 18 and above the circuit board 29 to capture an image of predefined areas of the circuit board or the stencil, respectively.

After one or more applications of the solder paste to circuit boards, excess solder paste may accumulate at the bottom of the stencil 18 and a stencil wiper assembly, generally indicated at 34, and may move beneath the stencil to remove the excess solder paste. In other embodiments, the stencil 18 may be moved over the stencil wiper assembly.

As mentioned above, stencil printers have traditionally required manual intervention to perform replacement of certain parts and/or replenishment operations. For example, a typical stencil requires replacement after a certain period of time, e.g., four hours. Also, stencils need replacement for separate production runs. In addition, solder paste cartridges, which supply temperature-controlled solder paste to the stencil printer, require replacement over time, e.g., within four hours or less. A separate production run may require a different type of solder paste material. Another item requiring periodic replacement is squeegee blades, which are subject to wearing during use. And finally, tooling used to support a substrate in a print position is subject to replacement when changing from one production product to another.

Embodiments of the present disclosure are directed to a delivery system that is configured to automate a changeover process for a stencil printer, or any other type of assembly processing equipment, including but not limited to dispensers, pick-and-place machines, wave and selective soldering machines, reflow ovens, cleaners and inspectors. In one embodiment, the delivery system includes a movable cart that is configured to engage a stencil printer to supply and receive replacement and replenishment parts and materials to the stencil printer to perform changeovers. For example, the stencil printer may include a docking station that is configured to receive the movable cart. The docking station may include an interface that enables the movable cart to communicate with the stencil printer. A single movable cart may be configured to include changeover stencils, replacement stencils, replacement solder paste cartridges, replenishment solder paste cartridges, replacement squeegee blades, replenishment squeegee blades, and replacement support tooling. During a changeover, for example, the stencil printer must be reconfigured to produce different items. Thus, for example, a different type of solder paste may be employed within the stencil printer to produce a different product.

It should be understood that the concepts described herein are not limited to replacing items within a stencil printer but apply as well to the other types of equipment described above.

The changeover process described herein can be achieved by a single movable cart that is configured to replace and/or replenish each item. In other embodiments, more than one movable cart can be provided. For example, the movable cart may be configured to support a predetermined number of stencils, squeegee blades, tooling and paste cartridges, which are selected for production runs anticipated for a particular day or a particular period of time. The movable cart and/or the stencil printer can be configured to identify the item for replacement, transport the item to and from the stencil printer, inspect the item, and interface with the stencil printer. The movable cart also may be configured to remove used items from the stencil printer. Moreover, the movable cart can be configured to store items long term.

For paste cartridges, the movable cart and/or the stencil printer can be configured to identify the paste cartridges, store the paste cartridges in a suitable environment, transport the paste cartridges to and from the stencil printer and the dispenser, inspect the paste cartridges, and interface with the stencil printer. The movable cart also may be configured to remove used parts, such as paste cartridges, from the stencil printer and the dispenser. Moreover, the movable cart can be configured to store paste cartridges long term. In one embodiment, long term storage of solder paste can be achieved by refrigeration at 0 to 10° C. (32 to 50° F.). The paste cartridges can be stored at a location in the movable cart to maintain this temperature range. In another embodiment, the movable cart can be configured to pre-heat the paste cartridges prior to use to ready the cartridges for use in the stencil printer.

Figure 4:
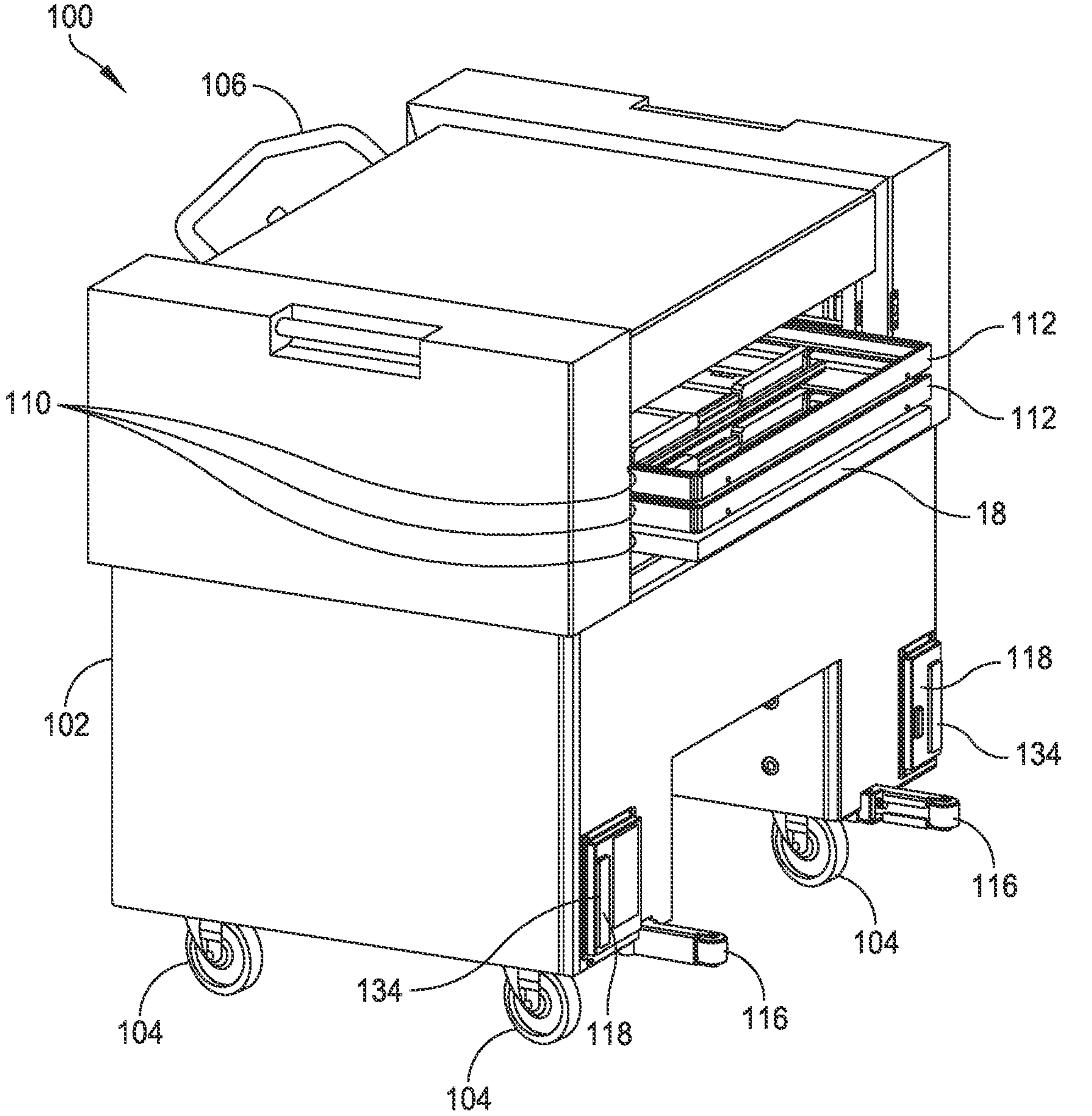
FIG. 4 is a perspective view of a movable cart of an embodiment of the present disclosure.

Referring to FIG. 4, in one embodiment, a movable cart, generally indicated at 100, includes a frame or housing 102 configured to support replacement and/or replenishment items. As shown, the housing 102 of the movable cart 100 is generally rectangular and is supported on wheels or casters, each indicated at 104. In one embodiment, the movable cart 100 is configured to be manually moved by an operator by pushing the housing 102 of the movable cart. In this embodiment, the movable cart 100 can be configured with a push bar or a handle 106. In another embodiment, the movable cart 100 is configured to be automatically moved, either by remote control or by an automated control associated with the movable cart, the stencil printer 10, the production line, and/or some other dedicated control. In this embodiment, the movable cart 100 can include wheels that are driven by a suitable motor and drive train, and a control associated with the movable cart. Or, in other embodiments, the control can be associated with the stencil printer 10, the production line, and/or some other dedicated control configured to control the movable cart. The movable cart 100 further can include one or more sensors and/or a vision system, e.g., cameras, to guide the movable cart from a stockroom, for example, to the stencil printer 10.

In one embodiment, the movable cart includes one or more shelves, each indicated at 110, which are configured to store items for the stencil printer 10. For example, the shelves 110 can be specifically designed to support stencils, e.g., stencil 18 and/or tooling trays, each indicated at 112. As shown, the movable cart 100 is supporting a single stencil 18 on one shelf 110 and two tooling trays 112 on the two shelves 110 located above the shelf 110 supporting the stencil. The shelves 110 can be configured to move vertically within the housing to achieve a height suitable to operate with the stencil printer 10. In one embodiment, the shelves 110 are provided within a carriage, which is designed to move up and down within the housing 102 of the movable cart 100. Further, the shelves 110 can be configured to be extended and retracted within the housing 102 of the movable cart 100. Specifically, each shelf 110 can be configured to extend from the housing 102 to present the stencil 18 or the tooling tray 112 as the case may be to the stencil printer to transfer an item to the stencil printer or to receive an item from the stencil printer. FIG. 4 illustrates the shelves 110 extending the stencil 18 and the tooling trays 112. Once extended, the shelf 112 is configured to retract back into the housing 102 of the movable cart 100.

In some embodiments, some shelves 110 may be designated as "clean shelves" to support clean or new items ready to be used within the stencil printer 10. Some shelves 110 may be designated as "dirty shelves" to support used items to be taken away from the stencil printer 10. The shelves 110 can be spaced apart from one another specific distances to receive various items. For example, the shelves 110 can be spaced apart ⅜-inch to 1½-inch from one another to accommodate stencil frame thicknesses.

The movable cart 100 illustrated in FIG. 4 is fully loaded for automated transfer of items to and from the stencil printer. Specifically, as described above, the movable cart 100 includes a new stencil 18 and two tooling trays 112, one tray fully loaded with items, including squeegee blades and tooling, and an empty tray to receive used items from the stencil printer.

The movable cart 100 can be configured with an interface, which is designed to dock within a docking station provided on the stencil printer 10, both from a mechanic interface and an electronics communication interface. In a particular embodiment, the movable cart 100 can be configured with a unique mechanical interface that mates with a unique mechanical docking station of the stencil printer 10. The unique mechanical interface/docking station can include geometric features. In another embodiment, the movable cart 100 can be configured with pins that are received within guides associated with the stencil printer 10 to register the movable cart with the stencil printer prior to fully docking the movable cart. Other types of guides can be used, such as electrical/magnetic guides, vision guides, sensors, latches, etc. The movable cart 100, when docked within the docking station of the stencil printer 10, can physically engage the stencil printer or be spaced from the stencil printer.

As shown in FIG. 4, the movable cart 100 includes two spaced apart roller assemblies, each indicated at 116, which are designed to interact with features associated with the stencil printer, e.g., stencil printer 10, to guide the movable cart to a docked position. Each roller assembly 116 includes an arm that extends from the housing 102 of the movable cart and a roller coupled to the arm at the end of the arm. The roller assemblies 116 are positioned to engage features formed in the stencil printer when docking the movable cart 100 on the stencil printer. Further, the movable cart 100 includes two interface panels, each indicated at 118, which provide mechanical connection to and electrical communication between the movable cart 100 and the stencil printer. The description of the interface panels 118 will be described in greater detail below.

Figure 5:
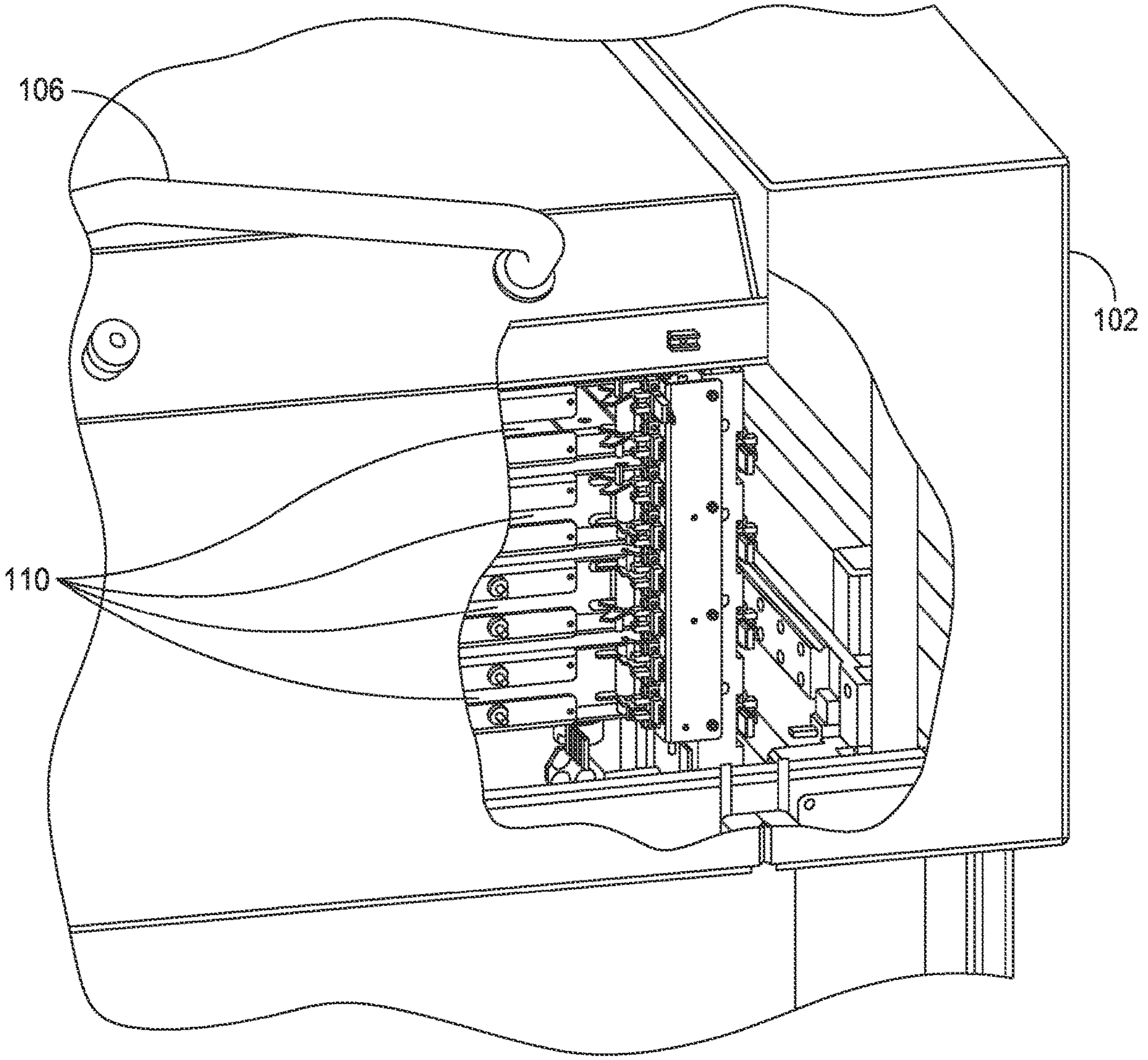
FIGS. 5 and 6 are an enlarged perspective views of the movable cart with portions removed to reveal aspects of the movable cart, specifically sleeves or shelves of the movable cart in home positions.
Figure 6:
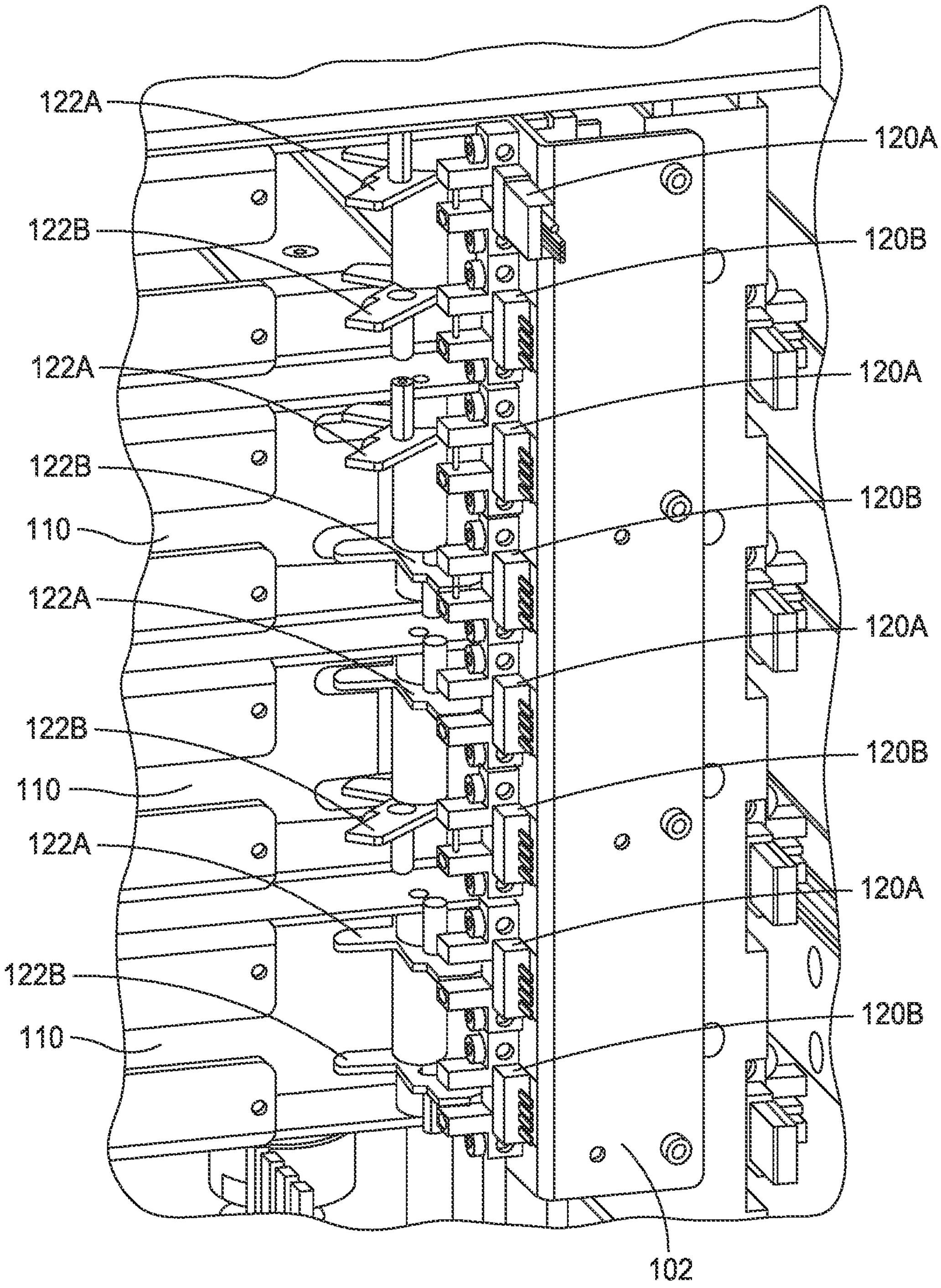

Referring to FIGS. 5 and 6, as described above, the movable cart 100 includes shelves 110 that fully retracted within the housing 102 of the movable cart in a home position. The manner in which the shelves operate to extend and retract within the housing 102 of the movable cart will be described with reference to FIGS. 21-25 below.

Figure 7:
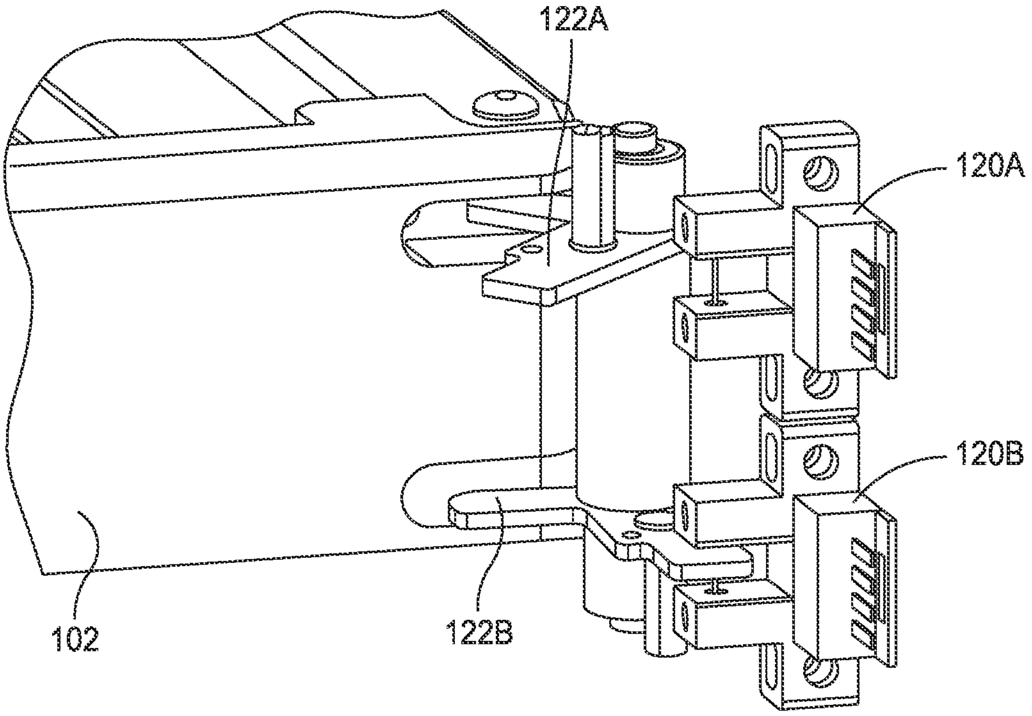
FIG. 7 is an enlarged perspective view of upper and lower pivoting flags and sensors of the movable cart.

A sensor system is provided to determine the position and type of item contained by each shelf 110. Specifically, each shelf 110 is sized and shaped to support a generally planar item, such as a stencil 18 or a tooling tray 112. The sensor system is designed to inform an operator of the type of item contained within the shelf 110, e.g., a stencil 18 or a tooling tray 112 and whether the item is fully received within the shelf in what may be called a home position. For each shelf, the sensor system includes two sensors, an upper sensor 120A and a lower sensor 120B, and two pivoting flags, an upper pivoting flag 122A and a lower pivoting flag 122B, which can be provided to indicate when each shelf 110 is in the home or fully retracted position. With additional reference to FIG. 7, the contents of each shelf 110 of the four cart shelves must be known and verified before and during a transfer to or from the stencil printer. In one embodiment, the two optical sensors 120A, 120B and the two pivoting flags 122A, 122B are mounted in the housing 102 of the movable cart 100. For each shelf, the first sensor 120A is associated with the first flag 122A and positioned at an upper location with respect to the shelf and the second sensor 120B is associated with the second flag 122B and positioned at a lower location with respect to the shelf. In the shown embodiment, there are four shelves, with the first (upper) shelf being shown empty, the second shelf positioned below the first shelf being shown with a loaded tooling tray, the third shelf positioned below the second shelf being shown with an unloaded tooling tray, and the fourth (lower) shelf being shown with a stencil. When the shelves 110 are in a home position, each type of item, e.g., the stencil 18 or the tooling tray 112 (loaded and unloaded) will engage the pivoting flags 122A and/or 122B in a different manner due to their geometry. Therefore, when the shelves 110 are in the home position within the housing 102 of the movable cart 100, the sensors 120 will return one of the following signals:

Upper low(off) and lower low(off)=shelf empty;

Upper high(on) and lower low(off)=load tool tray;

Upper low(off) and lower high(on)=unload tool tray; and

Upper high(on) and lower high(on)=stencil.

This method is also useful for ensuring the operator has inserted the stencil 18 and/or the tooling tray 112 properly into the shelf 110 and it is not protruding too far such that it might cause an interference with the stencil printer during the transfer process.

The roller assemblies 116 may be employed to perform a method for pre-alignment and ease of use to dock the movable cart 100 to the stencil printer. Specifically, the roller assemblies 116 ensure no unintentional movement of the movable cart 100 in the x-axis, y-axis and z-axis directions once the movable cart is docked with the stencil printer.

As described herein, the movable cart 100 is used to bring new supplies to the stencil printer and is coupled or otherwise connected to the stencil printer to transfer of the items from the movable cart to the stencil printer. The movable cart 100 when pre-positioned to engage the stencil printer is pre-aligned to the stencil printer to facilitate power and electronic communication between the movable cart and the stencil printer.

Figure 9:
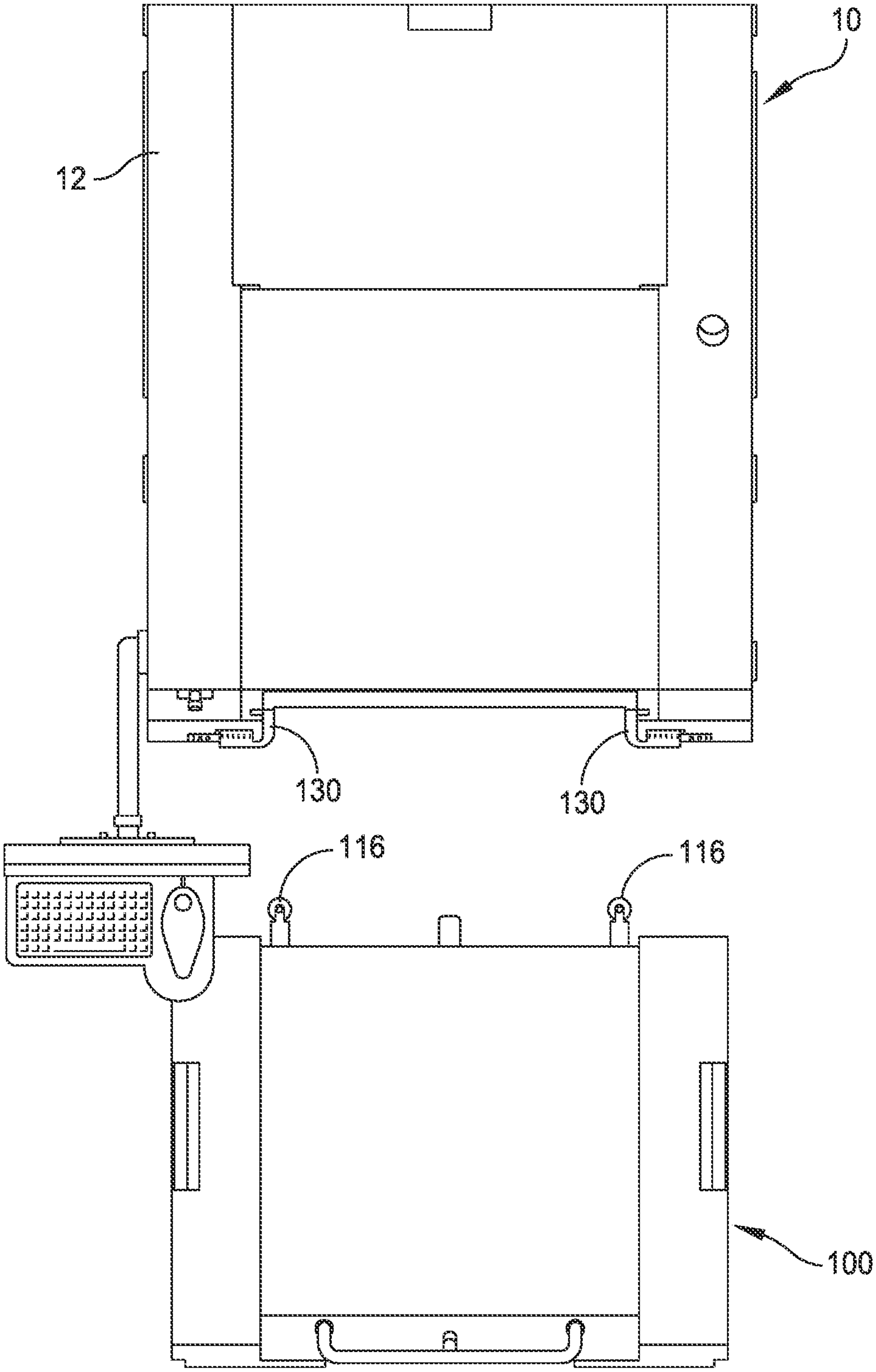
FIG. 9 is a top plan view of the movable cart and a stencil printer prior to docking the movable cart to the stencil printer.

Referring to FIG. 9, in one embodiment, the movable cart 100 has the two forward facing rollers 116, with one roller assembly located on the lower left side of the housing 102 of the movable cart and the other roller assembly located on lower right side of the housing of the movable cart. The roller assemblies 116 are positioned to contact guides, each indicated 130, on the face of the stencil printer 10 to pre-align the movable cart 100 in the x-axis direction.

Figure 8:
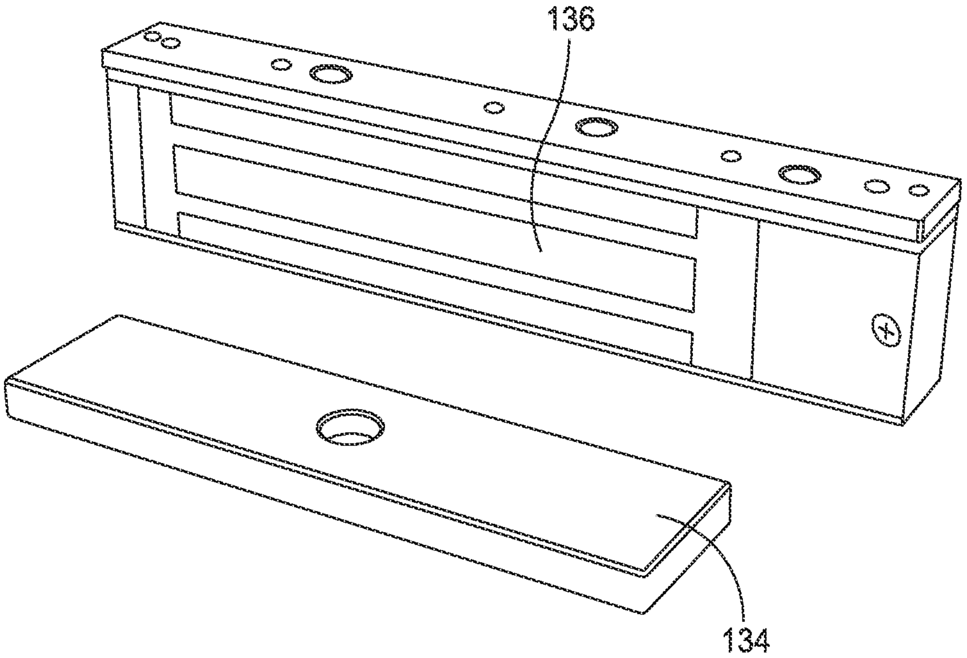
FIG. 8 is perspective view of a magnetic lock used to secure the movable cart to the stencil printer.

The movable cart 100 is then further pushed forward until steel plates, each indicated at 134, with one steel plate 134 being located on the interface panel 118 positioned on the left lower side of the movable cart and the other steel plate 134 being located on the interface panel 118 positioned on the right lower side of the movable cart, as shown in FIG. 4. Each steel plate 134 comes in contact with a magnetic field produced by a respective latching magnet 136 of the stencil printer, which is shown in FIG. 8. In one embodiment, the latching magnet 136 provided on the stencil printer is an electromagnet manufactured by Security Door Controls, Model E300. The latching magnet 136 eliminates the need for keys and expands the reach of access control systems. The latching magnet 136 is compact and provides a higher level of security than other types of locking devices. The latching magnet 136 is configured to communicate with a controller associated with the movable cart 100 or the controller of the stencil printer 10, such as controller 14, to control the operation of the electromagnet of the latching magnet to secure or unsecure the movable cart from the stencil printer 10. A display, such as the display 16 associated with the stencil printer 10, may be provided to show the status of the latching magnet 136 in the locked or unlocked status with respect to the movable cart 100.

Each latching magnet 136 is in a "power on" condition, and ready to dock the movable cart 100 asynchronously to the stencil printer to maximize the efficiency of the stencil printer and to eliminate cycle time impact. Once the movable cart 100 is fully engaged to the latching magnets 136, software associated with the controller of the stencil printer is notified by means of safety sensors on the left side and the right side of the movable cart to ensure full engagement of the movable cart before power and communication are applied to the movable cart. One benefit of this structure is that the latching magnets 136 produces a strong magnetic force to hold the movable cart 100 in place with respect to the stencil printer and to prevent the movable cart from being moved in the x-axis, y-axis and z-axis directions once engaged, as each electromagnet of the latching magnet has approximately 600 pounds (lbs) pull force and excellent shear resistance. This type of latching magnet 136 also has a unique magnetic flux path that only makes it possible for full force within 0.010 in. of engagement of the steel plate 135 for safety.

Figure 10:
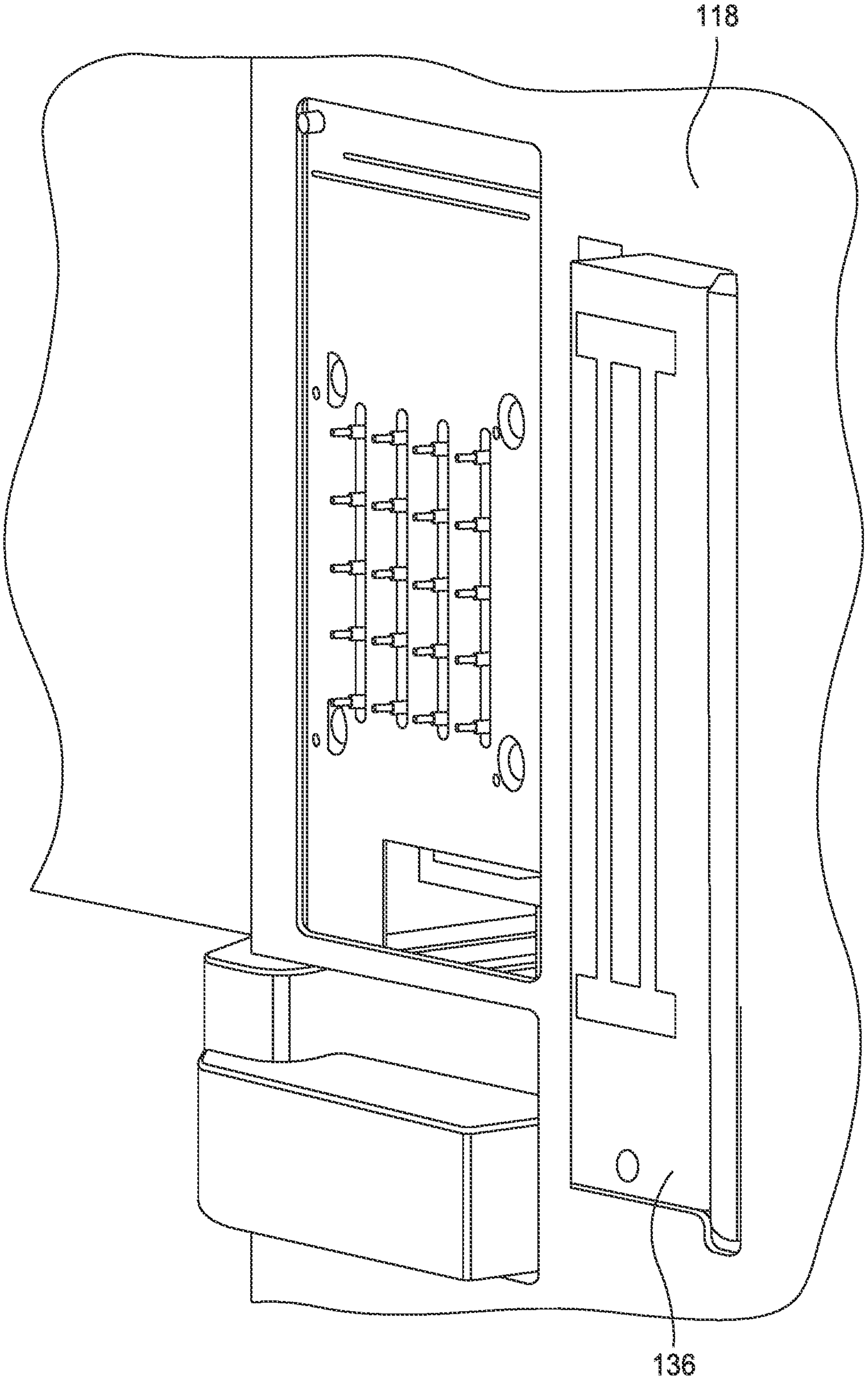
FIG. 10 is an enlarged perspective view of a latching magnet.
Figure 11:
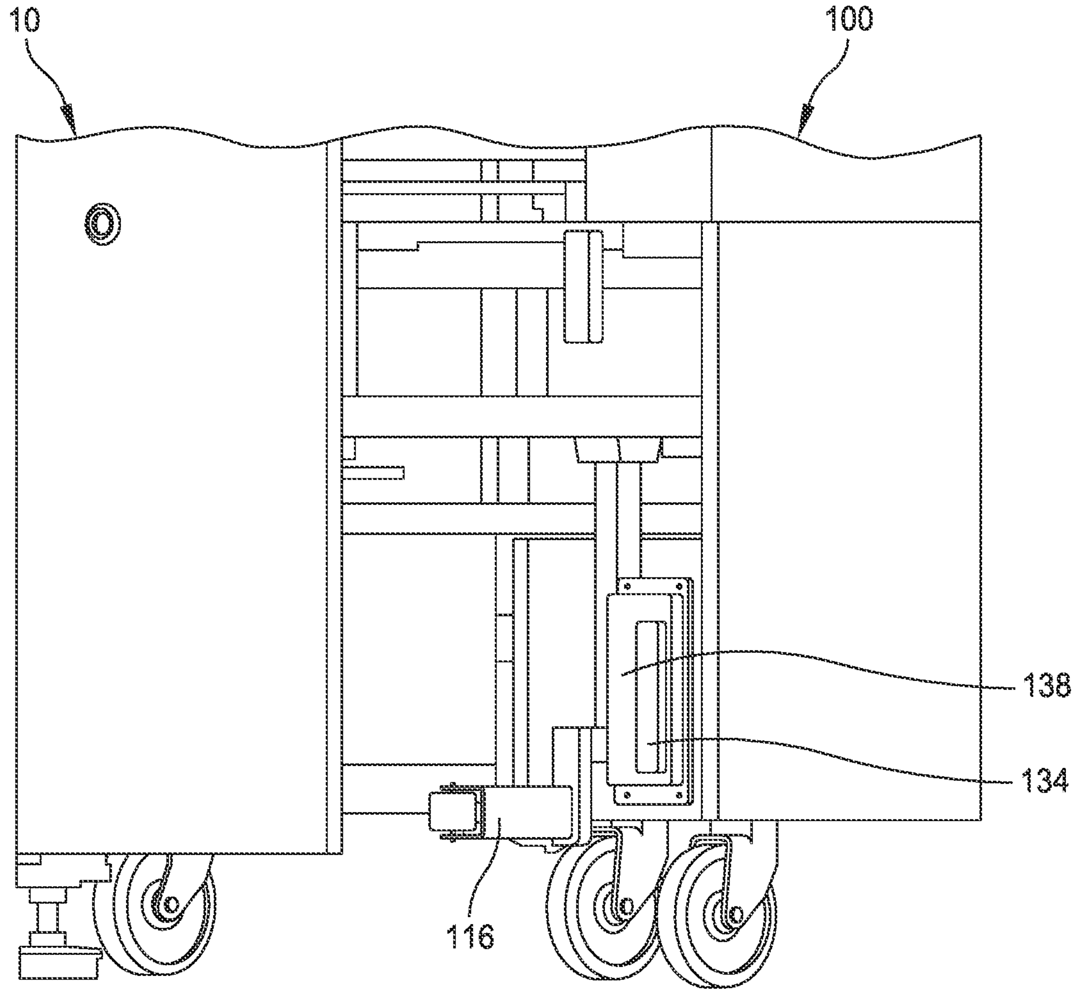
FIG. 11 is a side view of the movable cart showing an alignment sensor and a mating feature of the movable cart.

FIG. 9 illustrates the movable cart 100 approaching the stencil printer 10, with the roller assemblies 116 of the movable cart being aligned with their respective guides 130 of the stencil printer. FIG. 10 illustrates the interface panel 118 having the latching magnet 136 on the stencil printer 10. FIG. 11 illustrates an alignment sensor 138 and the steel plate 134 on the movable cart 100.

When the movable cart 100 is ready to be replenished (or removed from the stencil printer 10), power is removed from the movable cart and the latching magnets 136 associated with the stencil printer are deenergized, which allows the operator to roll the movable cart away from the stencil printer. Once the left and right alignment sensors 138 indicate to the software of the controller 14 of the stencil printer 10, the movable cart 100 has been removed from the stencil printer, and the latching magnets 136 are re-energized to be ready for the next docking cycle.

A method of connection between the movable cart 100 and the stencil printer 10 includes two mating connector halves, one connector half having an array of contacts that are spring loaded to aid in misalignment and the other connector half having a complementing array of hard gold pads, specifically, gold reinforced with nickel for durability, to complete a circuit between the moveable cart and the stencil printer.

Figure 12:
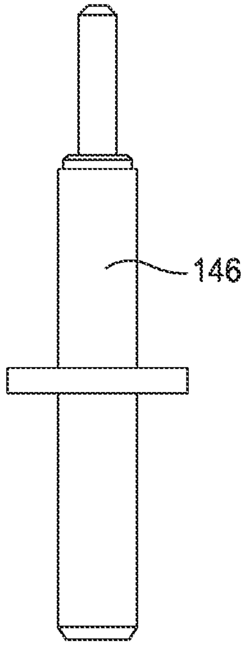
FIGS. 12 and 13 are views showing a spring contact.
Figure 13:
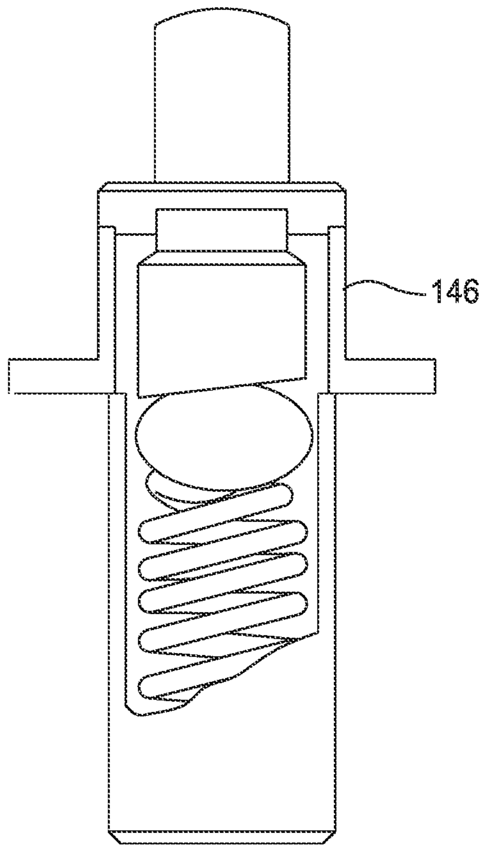
Figure 14:
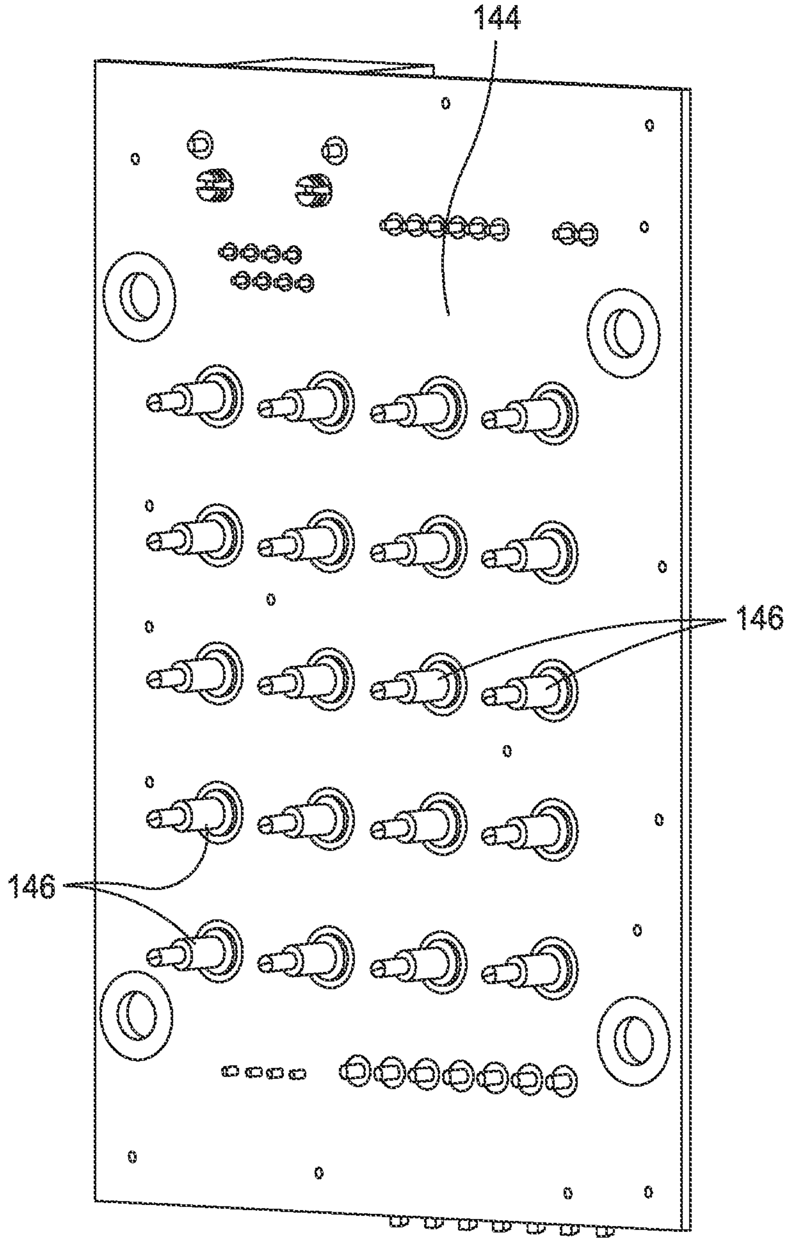
FIG. 14 is a perspective view of a first connector half having a plurality of spring contacts provided on the stencil printer.

The first connector half includes an array of spring contacts. FIG. 14 illustrates a first connector half 144 having an array of spring contacts 146. An exemplary spring contact 146 is illustrated in FIGS. 12 and 13. In the shown embodiment, the spring contact 146 is manufactured by Smiths Interconnect Americas, Inc., Part #101247. The first connector half 144 is mounted to the stencil printer 10 and assembled in an array that will aid in the event of minor misalignment of the movable cart 100 due to defects in the manufacturing facility beyond the control of the manufacturer of the movable cart. Facility defects include uneven floor or floors not being stiff enough and prone to depression of floor material.

Figure 15:
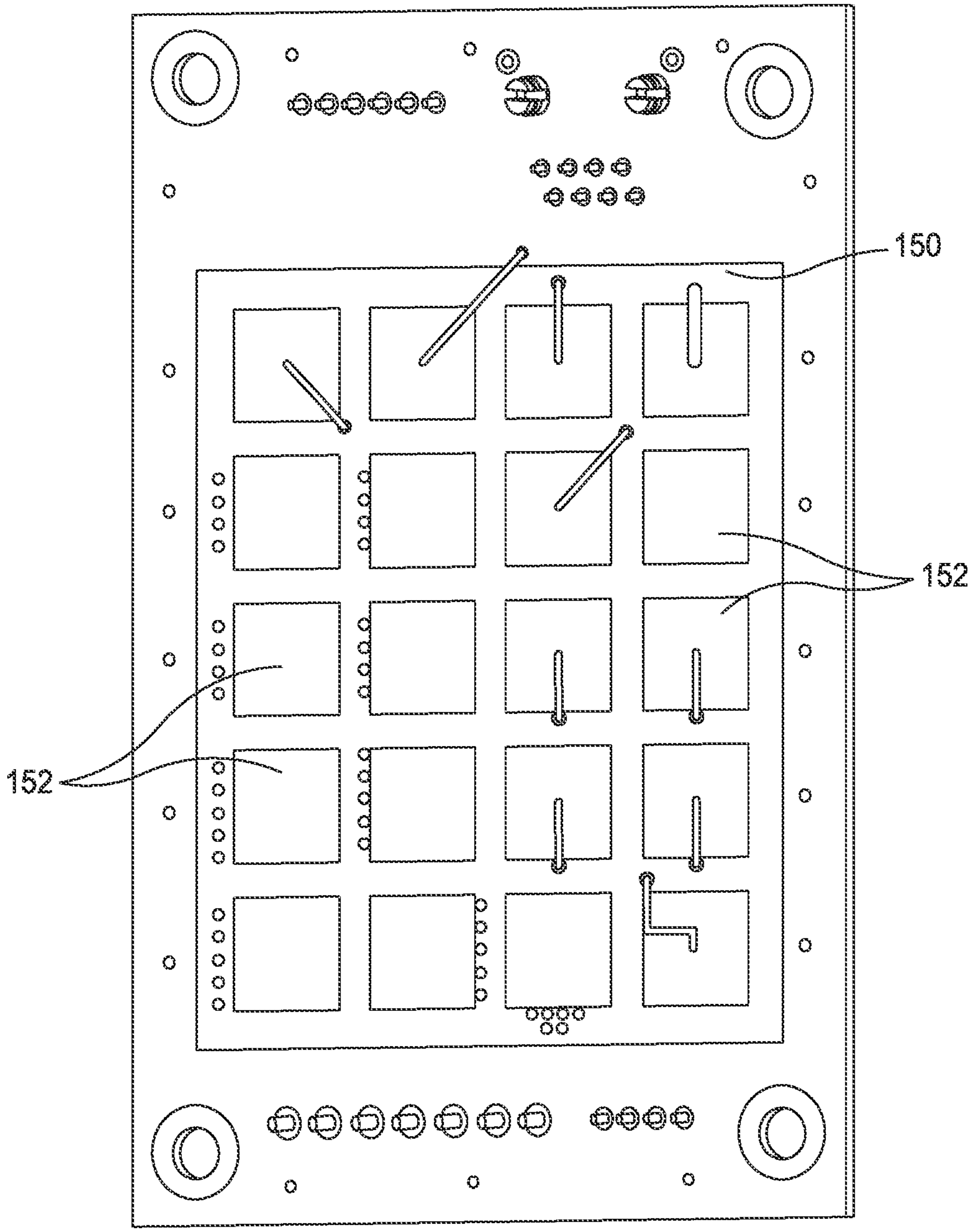
FIG. 15 is a front view of a second connector half having a plurality of pads.

The second connector half having the hard gold pads is mounted to the movable cart 100 as part of the interface panel 118 and is rigidly mounted. This ensures a smooth flat interface for the spring-loaded contacts 146 described above. FIG. 15 illustrates a second connector half 150 having an array of hard gold pads, each indicated at 152. The array of hard gold pads 152 of the second connector half 150 matches the array of spring contacts of the first connector half.

When the two connector halves 144, 150 are mated, i.e., when the movable cart 100 is docked to the stencil printer 10, the two connector halves are initially aligned by setting the stencil printer adjustment height in accordance with SEMA industry standards and then the movable cart is mated to the stencil printer. Once mated, an additional step is performed to adjust a final height of the first connector half 144, i.e., the spring contact side, so that the spring contacts 146 are centered to the mating hard gold pads 152 of the second connector half 150 on the movable cart 100 to with approximately 1 millimeter (mm). This ensures any subsequent movable carts mated to the stencil printer 10 will be properly mated and ensure proper connection of all the signals passing between the stencil printer and the movable cart.

The arrangement is that the two connector halves 144, 150 are laid out to provide a maximum misalignment of ±4 mm in the x-axis direction, ±2 mm in the y-axis direction, ±4 mm in the z-axis direction. This also equates to ±2 degrees of roll pitch and yaw flexibility.

Figure 16:
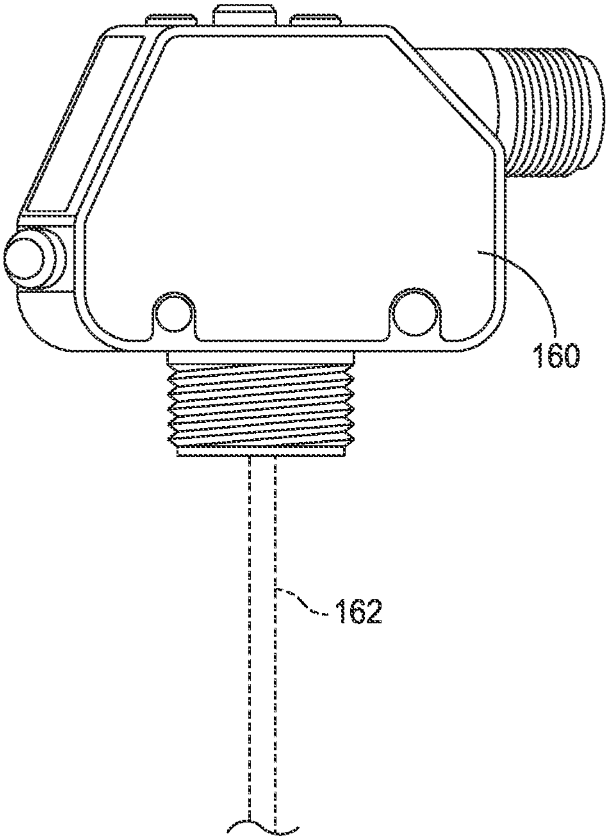
FIG. 16 is perspective view of a laser sensor that is used to determine a level of material within a material cartridge tube.

Another aspect of the present disclosure is directed to a method of measuring material in a cartridge tube for a carousel dispenser. Material cartridge tubes that are introduced into the stencil printer have a finite amount of material within the cartridge tube. As the material is used within the stencil printer, sometimes it is necessary to return a cartridge tube to the material carousel that is not entirely empty. This creates an issue for the operator to exactly know when to bring additional material cartridge tubes to the carousel or for manufacturing execution systems (MES) to keep track of material used during production. With reference to FIG. 16, the assembly is capable of determining a method to accurately measure the remaining contents with the material cartridge tube, utilizing a laser height sensor, generally indicated at 160, to sense the plunger seal within any material cartridge tube. As shown, the laser height sensor is configured to generate a laser beam 162.

Figure 17:
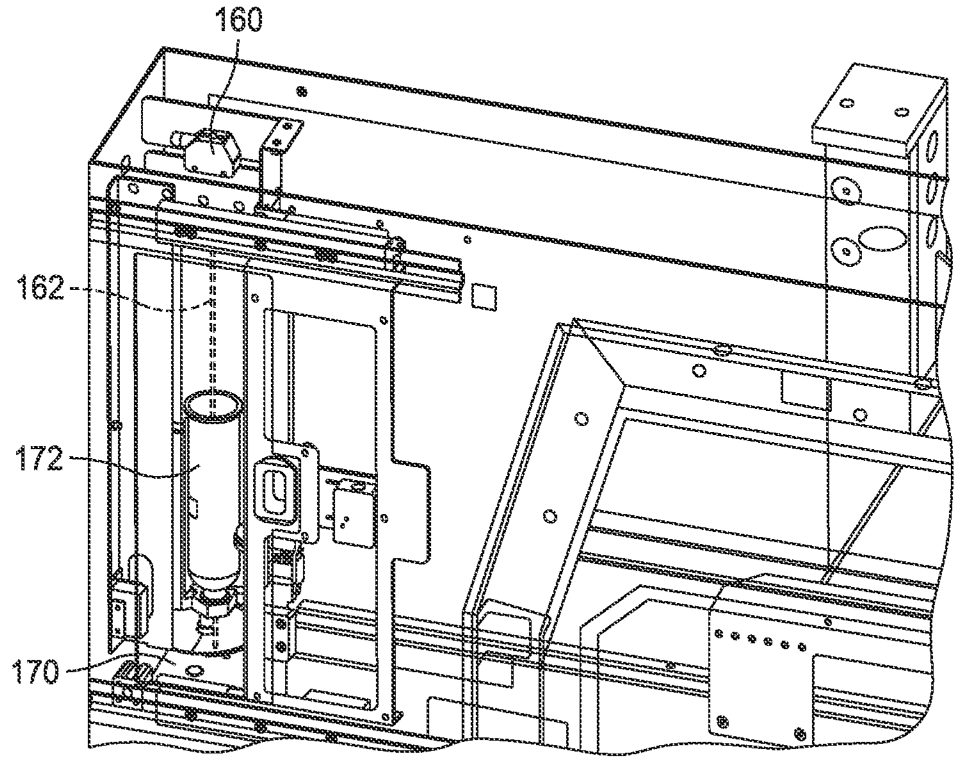
FIGS. 17 and 18 are perspective views of the stencil printer with portions removed to show the laser sensor positioned to sense a level of material within the material cartridge tube.

Referring to FIG. 17, the stencil printer 10 is configured with a carousel 170 that is configured to store and present paste cartridges, such as paste cartridge or tube 172, to the print head assembly 20 of the stencil printer. The laser height sensor 160 is calibrated after it is strategically positioned above the carousel 170 to point downward to sense the zero-reference position. In one embodiment, the laser height sensor 160 is manufactured by Banner Engineering Corporation, Part #Q4XTKLAF600-Q8. The electrical output of the laser height sensor 160 is then read by the controller 14 of the stencil printer 10 to store the zero-reference position.

Figure 18:
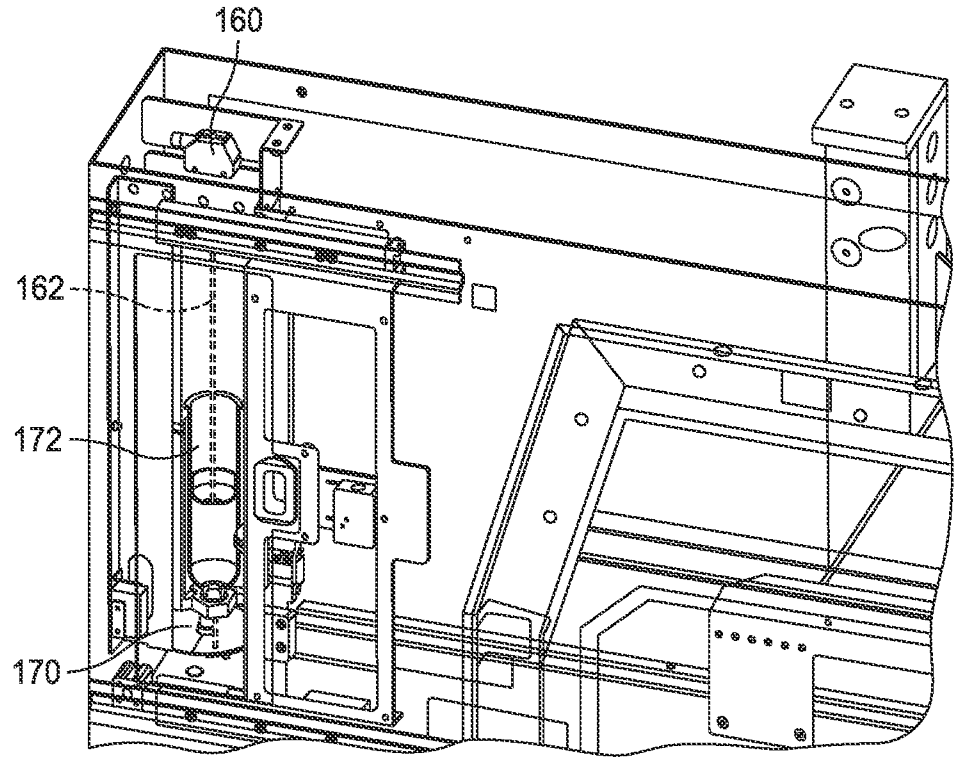

Referring to FIG. 18, when a material cartridge tube 172 is place in one of the material slots provided in the carousel 170, the carousel will rotate the material cartridge tube to the pickup location. Once in the pickup location, the electrical output of the laser height sensor 160 is read by the controller 14 of the stencil printer 10 to record and compare to the zero-reference position to determine the contents of the material cartridge tube 172.

If the contents of the material cartridge tube 172 are determined to be empty, the information is sent though the facility MES system for an operator to exchange the cartridge tube 172 and an external indicator is flashed alerting any local operator that the material is ready to be replaced. The external indicator can be part of the display 16 of the stencil printer 10. If the material cartridge tube 172 is determined to have sufficient material for production, that information is used by the controller 14 to determine how many PCBs can be processed until empty to be returned to the carousel empty slot position.

Figure 19:
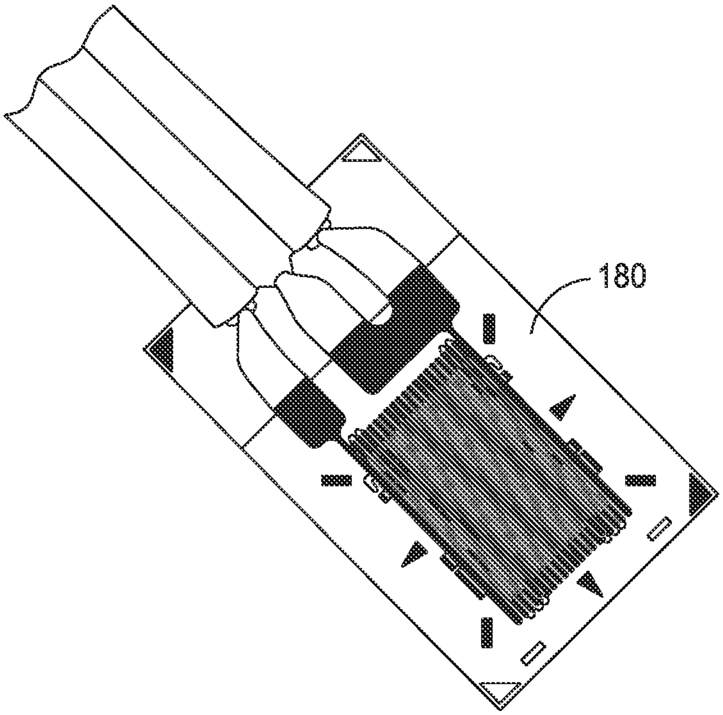
FIG. 19 is a perspective view of a strain gauge.
Figure 20:
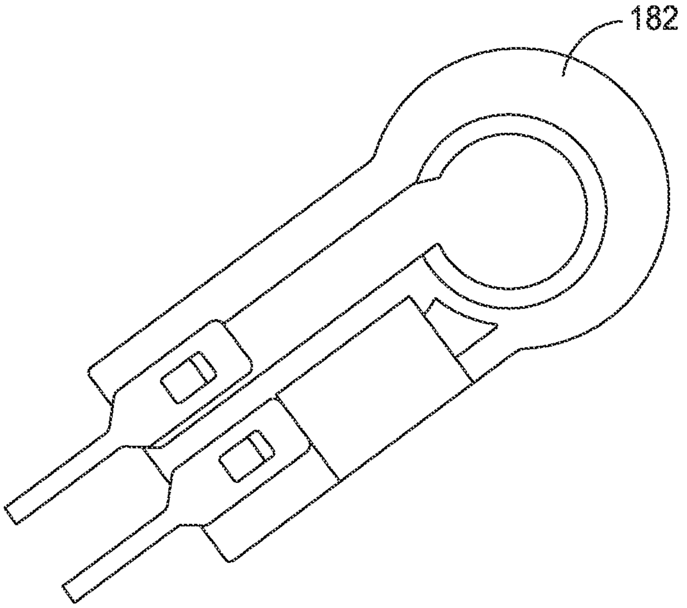
FIG. 20 is a perspective view of a flex force sensor.

An alternate method to determine the remaining contents of a material cartridge tube 172 may be performed by measuring the weight of the cartridge tube. Referring to FIG. 19, a strain gauge 180 can be employed to convert force to an electrical output that is read by the controller 14 of the stencil printer 10 to determine the weight of the material cartridge tube 172 within the slot of the carousel 170. Example of the types of force gauges that can be utilized are linear strain gauges. In one embodiment, the strain gauge 180 may be manufactured by Vishay Precision Group, Model #MMF403994. Referring to FIG. 20, a flex-force sensor 182 can be used in place of the strain gauge 180. In this embodiment, the flex-force sensor 182 may be manufactured by Tekscan, Model #A101.

Figure 21:
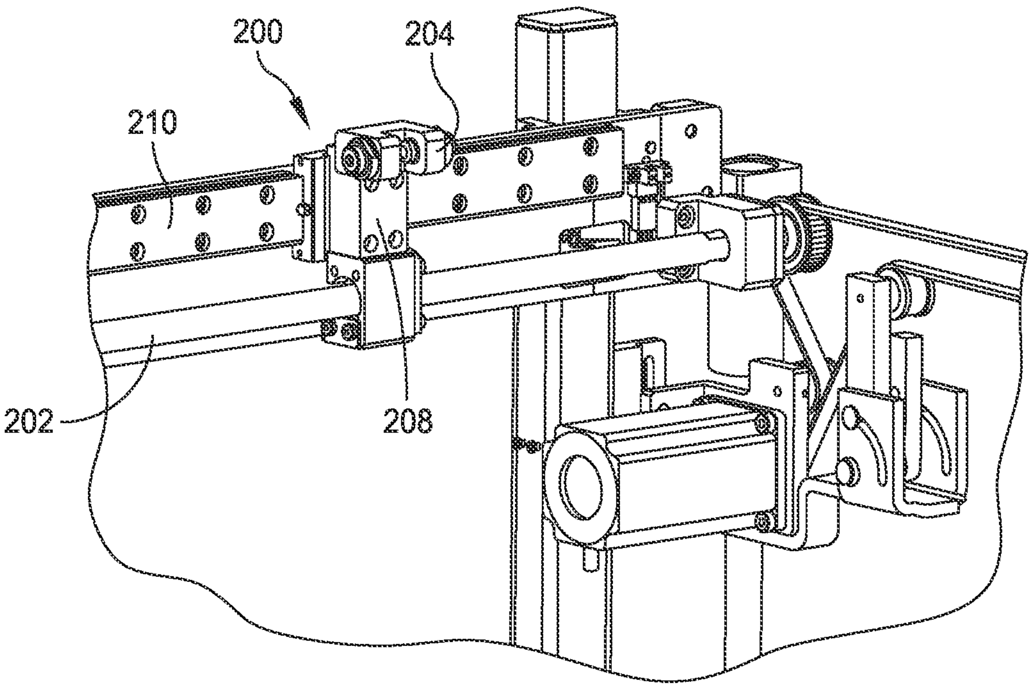
FIG. 21 is a perspective view of a drive mechanism used to extend and retract a shelf of the movable cart.
Figure 22:
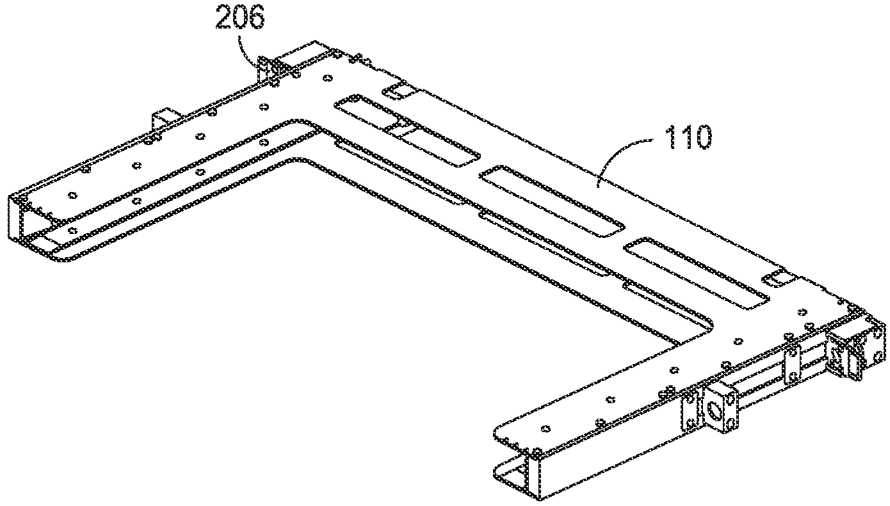
FIG. 22 is a perspective view of a shelf of the movable cart including a drive bar of the drive mechanism shown in FIG. 21.

Referring to FIGS. 21 and 22, the movable cart 100 includes a drive mechanism, generally indicated at 200, configured to move each shelf 110 laterally so that the shelf can extend into and retract from the stencil printer 10. The drive mechanism 200 includes a motor driven leadscrew 202 to extend and retract each shelf 110 of the movable cart 100 into and out of the stencil printer 10. When the movable cart 100 is elevated to the appropriate height, a drive button 204 (FIG. 21) engages a drive bar 206 (FIG. 22), which is attached to the side of each shelf 110. When the leadscrew 202 is rotated, the drive buttons 204 provided on each side of the shelf push the drive bar 206 and the shelf 110 out of the movable cart 100 or pull the drive bar and the shelf into the movable cart, depending on the direction of rotation of the leadscrew.

Figure 23:
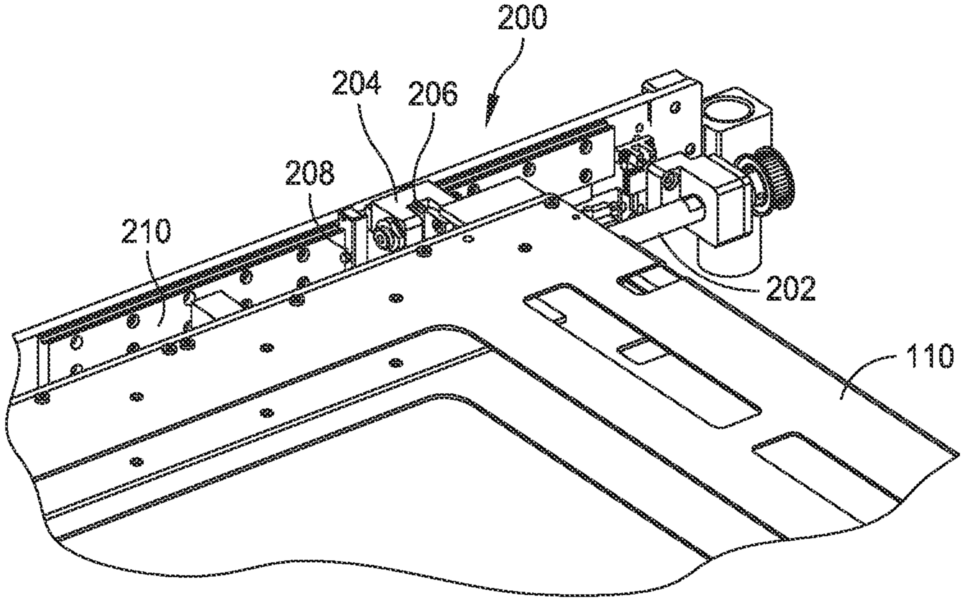
FIG. 23 is another perspective view of the drive mechanism having the drive bar.

Referring to additionally to FIG. 23, the drive mechanism 200 includes a bracket 208 on each side of the shelf 110 on which the drive button 204 is secured. The bracket 208 is secured to a linear bearing 210 and to the leadscrew 202 so that the bracket moves laterally when the leadscrew is rotated. The drive bar 206 is attached to the bracket 208 to enable movement of the drive bar and the shelf 110.

Figure 24:
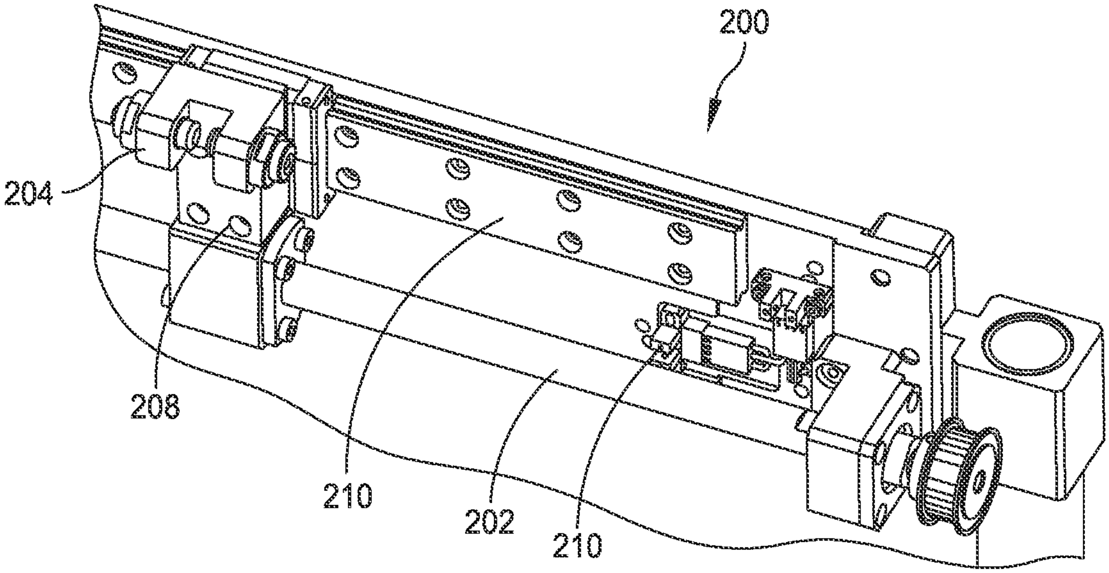
FIG. 24 is another perspective view of the drive mechanism showing a home sensor.

Referring to FIG. 24, a home sensor 212 is provided to determine whether the drive bar 206 and the shelf 110 is in a home (retracted) position.

Figure 25:
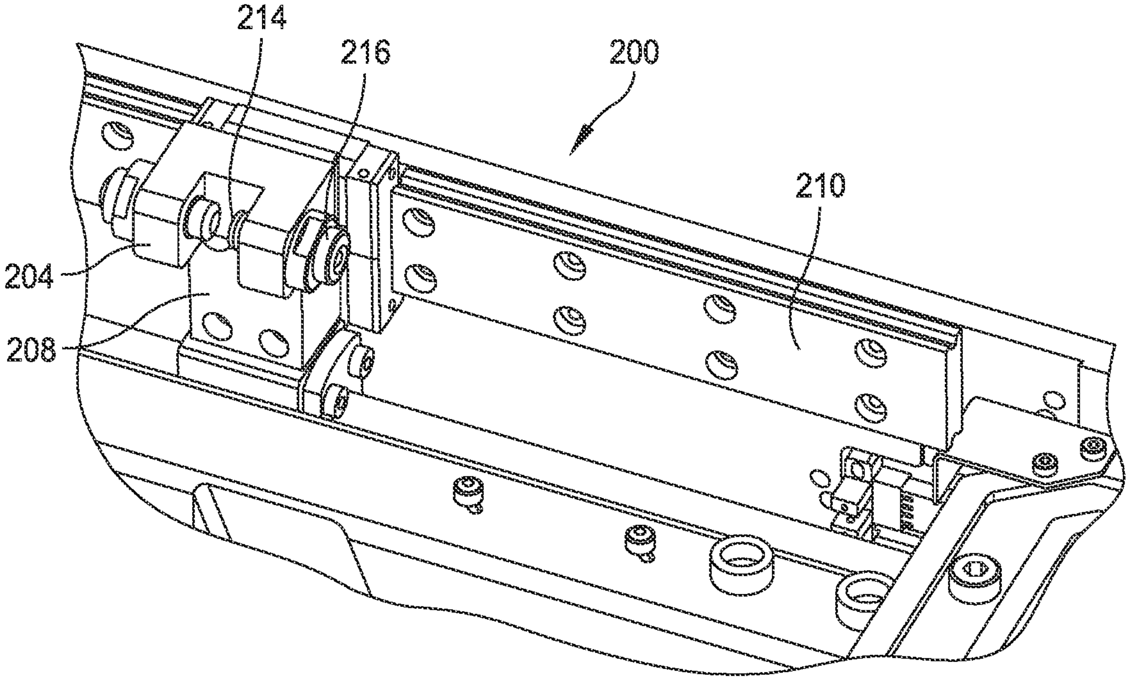
FIG. 25 is another perspective view of the drive mechanism.

Referring to FIG. 25, for a shelf 110 configured to support a stencil, such as stencil 18, a spring loaded plunger 214 is provided to ensure the stencil is in a proper position when the stencil is returned to the stencil printer 10. Further, a plunger sensor 216 is provided to determine if the stencil is positioned all the way in the back of the shelf 110 so that the stencil printer side stops pushing the stencil when returning the stencil from the stencil printer 10 to the movable cart 100. As the name implies, the plunger sensor 216 monitors the spring loaded plunger 214.

In one embodiment, the movable cart can be configured with one or more devices used to transport items from the movable cart to the stencil printer and from the stencil printer to the movable cart. For example, the device can include grippers to engage items, such as a substrate tooling tray, to move the tooling tray from the stencil printer to a tray of the movable cart and to move a different tooling tray from the movable cart to the stencil printer.

In one embodiment, the movable cart includes wheels that are driven by a suitable motor and drive train, and a control configured to control the movement of the movable cart. The movable cart further includes a power source, for example a battery, to power the movement of the movable cart via the motor and drive train.

In some embodiments, the movable cart includes a controller that is adapted to control the operation of the movable cart based on operational parameters obtained by the controller. The controller can be configured to communicate with the controller of the stencil printer and/or a controller associated with the production line. In one embodiment having multiple movable carts, the controller may embody a plurality of controllers provided in each movable cart that communicates with one another over a controller area network (CAN) Bus or other type of network. In other embodiments, a master controller may be provided to control the operation of the controllers of the movable carts. Each movable cart may be provided with a display, which is operably coupled to the controller. The display is adapted to display the operational parameters of the movable cart, such as, but not limited to, the number of full and spent/used paste cartridges. Suitable monitors may be provided to acquire such information. Alternatively, or in addition to the foregoing embodiment, the operational parameters may be displayed on the display provided within the stencil printer and/or a display associated with the production line.

In other embodiments, the controller can be a controller dedicated to one or more movable carts.

In some embodiments, material identification for items on the movable cart can include a device to manipulate the item and a scanner to scan and identify the item. For example, for paste cartridges, the movable cart can be configured to include a pinch wheel to rotate the paste cartridge to align a code or predetermined identification mark provided on the paste cartridge with scanner provided on the movable cart. The system is configured to tie material identification associated with the paste cartridge to a recipe, production time, etc., for the stencil printer. In one embodiment, a barcode to identify the items can be implemented. For example, the barcode can include a 1D scanner for UPC codes, a 2D scanner for QRC codes, a printed label applied on the item or a laser etched label etched on the item. In another embodiment, an RFID system to identify the items can be implemented. For example, the RFID system can include an RFID tag applied to the item and an RFID reader associated with the movable cart. With an RFID system, line-of-site between the reader and the item is not required. Moreover, scanning is not required to identify all items within the movable cart. In another embodiment, an imaging or vision system to identify the items can be implemented. The vision system could be an imaging system similar to the imaging system associated with the stencil printer or the dispenser, or on the movable cart.

In some embodiments, a database is provided to keep track of items stocked on the movable cart. In one embodiment, the database may include an open application (App) architecture and be configured to push data to the stencil printer. The movable cart can be configured to communication with the stencil printer to push/pull data to stencil printer and/or the production line or configured to communicate with the production line directly. The database can include job information or material information. The database further can communicate with a manufacturing execution system (MES) associated with the production line, the stencil printer, or both. The MES system can be configured to know which materials are required for a production run. The movable cart can be configured to communicate with the MES system to adjust delivery of items to the stencil printer.

The database further can be configured to retrieve information about items based on identification, e.g., a barcode number. In one embodiment, a central management system can be provided in which the stencil printer and/or the movable cart is programmed to accept material coming from movable cart. The movable cart is programmed to update the database to identify the materials on the movable cart, load information into the database associated with the movable cart and/or the stencil printer from a network, which is tied back to the MES system.

The database further can be configured to store additional information, such as usage and consumption. The database can be configured to store information locally or remotely, and can be configured to store data associated with one or more production runs. For example, the database can be configured to obtain and store data including but not limited to traceability of stencils, paste cartridges, squeegee blades and tooling, paste usage, cycles, etc.

The database can be configured to share prediction data when replacement/replenishment is needed. For example, with respect to storing information related to paste cartridges, the database can be configured to perform one or more of the following: store information on when paste cartridges need replenishment; perform a certain function if a paste cartridge is low on paste; trigger an alarm and/or a report that the paste cartridge is low; signal to an inventory control system associated with the stencil printer and/or the production line; perform analytics on consumable usage based on operating parameters and actual use and upstream/downstream equipment activity; predict changeout or maintenance (on the stencil printer and/or on the movable cart); and correlate over multiple sites to predict when to switch out paste cartridges. The database can be configured to share prediction data for other changeable/consumable items, such as for the stencils, paste cartridges, squeegee blades and tooling.

The database can be configured to store data associated with lot traceability. In addition, RFID or mechanical keying of a board or a stencil frame of the stencil is provided to ensure correct alignment/orientation/direction/front-back/top-bottom when these items are inserted into the stencil printer. This information can be used to verify correct orientation and/or fit before the items are transported from the warehouse and/or before the items are installed in the stencil printer. A low-cost reader can perform this function.

In one embodiment, a remote control can be configured to communicate with a database via the cloud or ISP to provide the functions described above. In another embodiment, the database can be part of a computer control system for the stencil printer or the movable cart or the production line.

In some embodiments, the movable cart can be configured to store materials. The movable cart can be configured to be flexible to accommodate where the materials come from and where the materials go to. In addition, the movable cart can be configured to identify where a particular material is located on the movable cart. In certain embodiments, the location, whether by auto delivery or manual delivery, is remote, local, on the movable cart, and/or on the stencil printer. As mentioned above, the movable cart can be configured to control environmental parameters. For example, the movable cart can be configured to control temperature for paste contained within paste cartridges by chilling stored paste cartridges, heating paste cartridges ready for use, and chilling paste cartridges that have been used, but still retain paste. In one embodiment, the housing can be insulated and a cooling/heating unit can be provided to cool or heat the interior of the housing and thus the paste cartridges. The movable cart further can be configured to predict when to start heating/chilling paste cartridges based on upcoming production, track time for shelf life, and individually control each paste cartridge to proper temperature and at correct time. In other embodiments, the movable cart can include a cartridge shooter to move paste cartridges. The movable cart further can be configured to control humidity to avoid condensate. The movable cart further can be configured to operate in a clean environment, e.g., a standard mechanical interface (SMIF) environment.

In some embodiments, the movable cart can be configured to perform inventory control. Specifically, the movable cart can be configured to identify where material is located, how much material is used, how the material is used, when the material is used, tie the material and information about the material to a customer inventory control system, and track material type consumed per board or lots of boards.

In some embodiments, the movable cart can be configured to organize items stored on the movable cart. As mentioned above, in one embodiment, one movable cart can be provided to store, transport and deliver multiple resources, including but not limited to paste cartridges. In another embodiment, the movable cart can be configured to store, transport and deliver a single resource or item to the stencil printer. The movable cart can be configured to service multiple production lines. In another embodiment, the movable cart can be configured to service one stencil printer.

In some embodiments, the movable cart can be configured to transport items from the movable cart to the stencil printer and from the stencil printer to the movable cart, and be able to account for elevation differences between the movable cart and the stencil printer. The transportation can be automated or manual. In one embodiment, movable cart can be moved by automatically guided vehicle (AVG) technology associated with the movable cart or remotely controlled. In another embodiment, the movable cart can be configured to move autonomously. In another embodiment, the movable cart can be configured to be moved manually. In yet another embodiment, the movable cart can be configured to move items stored on the movable cart automatically and/or manually. For example, the movable cart can be configured to move items automatically, and can provide for an interruption of a pre-planned activity in which the items are moved manually.

In some embodiments, timing associated with performing transportation functions of the movable cart can be programmed to account for shift change, e.g., a personnel shift, scheduled maintenance, on demand activities, e.g., a recipe change, and predictive events (just-in-time replacements). The timing can be programmed to meet multiple line balance control requirements, with one or more movable carts and to meet real-time on-demand material supply demands on the production line.

In some embodiments, the movable cart is configured to perform inspection. For example, the movable cart can inspect on cart and off cart items including stencils, paste cartridges, squeegee blades, and tooling. In one embodiment, a vision system associated with the movable cart can be configured to obtain images of the items. The vision system in conjunction with the controller, can be configured to inspect for cleanliness, damage, wear, and identification readability, e.g., is the barcode label worn, dirty or torn. The vision system can embody any type of 2D, 3D or color camera.

In some embodiments, the movable cart is configured to interface with the stencil printer, both from a mechanic interface and an electronics communication interface. In one embodiment, the movable cart can be configured with a unique mechanical interface that mates with a unique mechanical interface of the stencil printer. The unique mechanical interfaces can be geometric features. In another embodiment, the movable cart can be configured with pins that are received within guides associated with the stencil printer to register the movable cart with the stencil printer prior to fully docking the movable cart. The pins and guides can be reversed, with the pins provided on the stencil printer and the guides provided in the movable cart. Other types of guides can be used, such as electrical/magnetic guides, vision guides, sensors, latches, etc.

In some embodiments, the interface and the docking station can be configured with a clamping system to maintain the movable cart in place with respect to the stencil printer. For example, a magnetic clamping system can be employed.

In some embodiments, the stencil printer can be configured with multiple docking stations, e.g., five docking stations. The docking station can be provided at a front of the stencil printer or at a back of the stencil printer.

The movable cart and/or the stencil printer can be configured to verify whether the movable cart can be docked and interface with the stencil printer. In one embodiment, verification can be provided to confirm that the movable cart is in position and ready to interface with the stencil printer. This verification process can further determine whether correct materials are on the movable cart and whether the movable cart material information can be received from MES system, or locally identified. If not correct, the movable cart can be configured to activate an alarm and/or alert an operator if wrong or damaged materials are on the movable cart.

In some embodiments, the movable cart can be configured with actuation devices or actuators to move items onto and off of the movable cart once the movable cart is docked to the stencil printer. Embodiments of the actuators can be implemented on the movable cart, the stencil printer or both. In another embodiment, the items can be manually loaded and unloaded from the movable cart.

In some embodiments, the movable cart can be configured to interface with a production line. With this embodiment, the operator of the production line can confirm the correct location and acknowledge receipt of the movable cart on the stencil printer.

In some embodiments, the movable cart can be configured to communicate with the stencil printer, the production line, and/or select machines within the production line via an open platform. Communication systems can include a wired system, a wireless system (through a common network, mesh, Bluetooth, Wi-Fi, Zigbee, WAN, Nodes, Li-Fi, etc.), a combination of wired and wireless systems, and infrared (IR) system.

In some embodiments, the movable cart can be configured with a dedicated power source. In one embodiment, the movable cart includes a battery configured to power automated components provided in the movable cart, e.g., mechanisms used to move stencils into and out of the movable cart, mechanisms used to move paste cartridges into and out of the movable cart, mechanisms used to move squeegee blades into and out of the movable cart, and mechanisms used to move tooling into and out of the movable cart. In other embodiments, the movable cart can be configured with an uninterruptible power supply. The power source can be configured to support actuation while "docked" (high-voltage from stencil printer when docked, otherwise low-voltage when undocked). The power source can be configured to recharge for autonomous operations, e.g., recharge a battery from power provided by the stencil printer.

In some embodiments, the movable cart can be configured to function with the stencil printer. For example, the movable cart can be configured to provide a handshaking function with the stencil printer prior to a transfer of an item, e.g., "please give me paste cartridge #1234." The movable cart and the stencil printer can be configured with a communication protocol and/or a library reference on what is available to consume. The movable cart can be configured to determine whether the movable cart has correct items. The handshaking function can be configured to ensure the correct transfer of an item, e.g., "here's paste cartridge #1234," and/or the subsequent transfer of an item, e.g., "I now have paste cartridge #1234." In one embodiment, a mobile device can be configured to scan and identify items in the movable cart, and determine, for example, whether the items are ready for use, require cleaning, etc.

In some embodiments, the movable cart can be configured to address errors associated with handling and recovering items in the movable cart. For example, the movable cart can be configured to detect an incomplete action by one party, an incomplete transfer of an item, e.g., a stuck or jammed item, a dropped transfer, e.g., "I passed paste cartridge #1234 to you, don't you have it?," and a manual intervention or override, e.g., "here, let me help you." In one embodiment, a controller associated with the movable cart can be configured to perform static discharge control, data recovery and/or security.

In some embodiments, the movable cart can be configured with a higher level of capability. In addition to indexing all the equipment to the correct height, the movable cart would need to pull in/push out all equipment for machine gantries to attach.

In some embodiments, existing machine gantries, rails and print head of the stencil printer can be configured to shuttle items in and out.

In some embodiments, the movable cart can be configured with a paste cartridge indexer to load/unload paste cartridges.

In some embodiments, the movable cart can be configured to communication with the stencil printer, the production line and a warehouse associated with the production line.

In some embodiments, the movable cart can be configured with an electrical/pneumatic interface.

In some embodiments, the movable cart can be configured to track consumables—new and used on the movable cart, e.g., solder paste cartridges, including location, temperature and other data.

In some embodiments, the movable cart can be configured to scan all consumables with a suitable scanning device, such as a barcode reader or RFID reader.

In some embodiments, the movable cart can be configured with an indexing mechanism to properly locate consumables.

In some embodiments, the movable cart can be configured with a bypass switch to disconnect the movable cart from the stencil printer if the movable cart has an issue.

In some embodiments, the movable cart can be configured to be climate controlled, either actively or passively.

In some embodiments, the movable cart can be configured be controlled by an application (App) capable for smartphone integration.

As used herein, an "automated" or "fully automated" changeover describes the replacement or replenishment of an item without human intervention.

As used herein, a "partially automated" changeover describes the replacement or replenishment of an item with some or limited human intervention.

As used herein, "transport" or "transporting" describes moving an item from one position to another, either manually or with a machine.

As used herein, "install" or "installing" describes the process of placing an item in a position ready for use.

The concepts disclosed herein may be employed in other types of equipment used to fabricate electronic substrates, including pick-and-place machines, reflow ovens, wave soldering machines, selective solder machines, inspection stations, and cleaning stations. For example, the concepts directed to replacing tooling can be employed in pick-and-place machines used to mount electronic components onto electronic substrates. In another example, the concepts directed to replacing items can be employed in replacing solder within wave soldering and selective soldering machines and cleaning product within cleaning stations.

Having thus described several aspects of at least one embodiment, it is to be appreciated various alterations, modifications, and improvements will readily occur to those skilled in the art. Such alterations, modifications, and improvements are intended to be part of this disclosure, and are intended to be within the scope of the disclosure. Accordingly, the foregoing description and drawings are by way of example only.

The invention claimed is:

1. A system comprising:

a stencil printer having at least one item of a plurality of items for replacement within the stencil printer, the stencil printer including a docking station;

a movable cart configured to receive a used item and/or provide a new item to the stencil printer;

a first interface panel associated with one of the stencil printer and the movable cart, the first interface panel including a latching magnet and an array of metallic pads; and a second interface panel associated with the other of the stencil printer and the movable cart, the second interface panel including a metal plate and an array of contacts;

a controller associated with one of the stencil printer and the movable cart, the controller being configured to control the operation of the latching magnet to secure or unsecure the movable cart from the stencil printer; and a display configured to show a status of the latching magnet in a locked or unlocked status with respect to the movable cart, wherein, when docking the movable cart to the stencil printer, the latching magnet of the first interface panel is configured to magnetically secure the metal plate of the second interface panel, and the array of contacts of the second interface panel is configured to engage the array of metallic pads of the first interface panel.

2. The system of claim 1, wherein the first interface panel is associated with the stencil printer and the second interface panel is associated with the movable cart.

3. The system of claim 2, further comprising a third interface panel associated with the stencil printer and spaced apart from the first interface panel, and a fourth interface panel associated with the movable cart and spaced apart from the second interface panel.

4. The system of claim 1, wherein the metal plate is a steel plate.

5. The system of claim 1, wherein the latching magnet of the first interface panel is configured to communicate with the controller to control the operation of the latching magnet to secure or unsecure the movable cart from the stencil printer.

6. The system of claim 1, wherein the array of contacts includes a plurality of spring contacts.

7. The system of claim 6, wherein the metal pads include a plurality of hard gold pads.

8. The system of claim 1, further comprising a guide assembly to guide the movable cart to the stencil printer when docking the movable cart to the stencil printer.

9. The system of claim 8, wherein the guide assembly includes at least one forward facing roller secured to the housing of the movable cart, the at least one forward facing roller being configured to contact at least one guide provided on a face of the stencil printer.

10. The system of claim 9, wherein the at least one forward facing roller includes two spaced apart forward facing rollers and the at least one guide includes two spaced apart guides, the two spaced apart forward facing rollers being configured to contact the two spaced apart guides to guide the movable cart with respect to the stencil printer.

11. A method for mechanically and electrically coupling a movable cart to a stencil printer, the method comprising:

providing a stencil printer having at least one item of a plurality of items for replacement within the stencil printer, the stencil printer including a docking station;

providing a movable cart configured to receive a used item and/or provide a new item to the stencil printer;

providing a first interface panel associated with one of the stencil printer and the movable cart, the first interface panel including a latching magnet and an array of metallic pads;

providing a second interface panel associated with the other of the stencil printer and the movable cart, the second interface panel including a metal plate and an array of contacts;

magnetically securing the metal plate of the second interface panel with the latching magnet of the first interface panel;

engaging the array of metallic pads of the first interface panel with the array of contacts of the second interface panel;

controlling the operation of the latching magnet with a controller to secure or unsecure the movable cart from the stencil printer; and displaying a status of the latching magnet with a display configured to show whether the latching magnet is in a locked or unlocked status with respect to the movable cart.

12. The method of claim 11, wherein the first interface panel is associated with the stencil printer and the second interface panel is associated with the movable cart.

13. The method of claim 12, further comprising a third interface panel associated with the stencil printer and spaced apart from the first interface panel, and a fourth interface panel associated with the movable cart and spaced apart from the second interface panel.

14. The method of claim 11, wherein the latching magnet of the first interface panel is configured to communicate with the controller to control the operation of the latching magnet to secure or unsecure the movable cart from the stencil printer.

15. The method of claim 11, further comprising guiding the movement of the movable cart to the stencil printer when docking the movable cart to the stencil printer.

16. The method of claim 15, wherein guiding the movement of the movable cart includes a guide assembly having at least one forward facing roller secured to a housing of the movable cart, the at least one forward facing roller being configured to contact at least one guide provided on a face of the stencil printer.

17. The method of claim 16, wherein the at least one forward facing roller includes two spaced apart forward facing rollers and the at least one guide includes two spaced apart guides, the two spaced apart forward facing rollers being configured to contact the two spaced apart guides to guide the movable cart with respect to the stencil printer.

* * * * *